(12) United States Patent
Kuhn et al.

(10) Patent No.: US 12,554,767 B2
(45) Date of Patent: Feb. 17, 2026

(54) ADJUSTING ATTRIBUTION FOR CONTENT GENERATED BY AN ARTIFICIAL INTELLIGENCE (AI)

(71) Applicant: Sureel Inc., Pacifica, CA (US)

(72) Inventors: Christopher Benjamin Kuhn, Munich (DE); Tamay Aykut, Pacifica, CA (US); Diego Ponce De Leon Vera, Munich (DE); Paul Pauls, Munich (DE); Christoph Burgmair, Poing (DE)

(73) Assignee: Sureel Inc., Pacifica, CA (US)

( * ) Notice: Subject to any disclaimer, the term of this patent is extended or adjusted under 35 U.S.C. 154(b) by 10 days.

(21) Appl. No.: 18/424,967

(22) Filed: Jan. 29, 2024

(65) Prior Publication Data

US 2024/0193204 A1     Jun. 13, 2024

Related U.S. Application Data

(63) Continuation-in-part of application No. 18/384,899, filed on Oct. 30, 2023, now Pat. No. 12,013,891, and
(Continued)

(51) Int. Cl.
    *G06F 16/45*     (2019.01)
    *G06F 16/438*     (2019.01)
(Continued)

(52) U.S. Cl.
    CPC ............ *G06F 16/45* (2019.01); *G06F 16/438* (2019.01); *G06N 3/0455* (2023.01); *G06N 3/0475* (2023.01); *G06Q 30/0208* (2013.01)

(58) Field of Classification Search
    CPC .............................. G06F 16/45; G06F 16/438
(Continued)

(56) References Cited

U.S. PATENT DOCUMENTS 10,599,770 B1 *    3/2020    Strope ................... G06F 40/289
11,922,550 B1 *    3/2024    Ramesh ................ G06F 40/284
(Continued)

FOREIGN PATENT DOCUMENTS

CN      116012492 A    *    4/2023
CN      116402049 B    *    8/2023

OTHER PUBLICATIONS

Ruiz et al. "Dreambooth: Fine Tuning Text-to-Image Diffusion Models for Subject-Driven Generation." Mar. 15, 2023. 25 pages. https://arxiv.org/pdf/2208.12242 (Year: 2023).*
(Continued)

*Primary Examiner* — Kimberly L Wilson
(74) *Attorney, Agent, or Firm* — FP; Shiv S. Naimpally

(57) ABSTRACT

In some aspects, a server determines that an AI has generated an initial output based on an initial input that identifies: a type of content, a first characteristic of the content, and a first amount of influence of the first characteristic. The server determines an initial output embedding associated with the initial output generated by the AI. The server determines that the AI has generated a subsequent output based on a subsequent input that identifies: a second characteristic and a second amount of influence of the second characteristic. The server determines a creator attribution vector based at least in part on: the first amount of influence of the first characteristic and the second amount of influence of the second characteristic. The server initiates providing compensation to one or more content creators of the plurality of content creators based on the creator attribution vector.

20 Claims, 14 Drawing Sheets

Related U.S. Application Data a continuation-in-part of application No. 18/231,551, filed on Aug. 8, 2023.

(51) Int. Cl.
  *G06N 3/0455*   (2023.01)
  *G06N 3/0475*   (2023.01)
  *G06Q 30/0208*  (2023.01)

(58) Field of Classification Search
  USPC .......................................................... 707/736
  See application file for complete search history.

(56) References Cited

U.S. PATENT DOCUMENTS

| | | | | |
|---|---|---|---|---|
| 2020/0034442 | A1* | 1/2020 | Larson | G06Q 10/101 |
| 2022/0043965 | A1* | 2/2022 | Dvorak | G06F 40/103 |
| 2022/0350828 | A1* | 11/2022 | Ma | G06F 16/3347 |
| 2023/0075884 | A1* | 3/2023 | Jakobsson | H04L 9/50 |
| 2023/0252795 | A1 | 8/2023 | Tong et al. | |
| 2023/0360300 | A1* | 11/2023 | De Brouwer | G06Q 20/1235 |
| 2023/0401550 | A1* | 12/2023 | Mikolajczuk | G06Q 20/123 |
| 2024/0193821 | A1* | 6/2024 | Denison | G06F 40/40 |

OTHER PUBLICATIONS

U.S. Appl. No. 18/384,899—Notice Of Allowance, dated Mar. 5, 2024. 11 pages.
U.S. Appl. No. 18/242,898—Final Rejection, dated Mar. 12, 2024. 35 pages.

* cited by examiner

ADJUSTING ATTRIBUTION FOR CONTENT GENERATED BY AN ARTIFICIAL INTELLIGENCE (AI)

CROSS-REFERENCE TO RELATED APPLICATIONS

The present non-provisional patent application is a continuation-in-part of U.S. patent application Ser. No. 18/231,551 filed on Aug. 8, 2023 and U.S. patent application Ser. No. 18/384,899 filed on Oct. 30, 2023, all of which are incorporated herein by reference in their entirety and for all purposes as if completely and fully set forth herein.

BACKGROUND OF THE INVENTION

Field of the Invention

The technology disclosed relates to artificial intelligence type computers and digital data processing systems and corresponding data processing methods and products for emulation of intelligence (i.e., knowledge-based systems, reasoning systems, and knowledge acquisition systems); and including systems for reasoning with uncertainty (e.g., fuzzy logic systems), adaptive systems, machine learning systems, and artificial neural networks. In particular, this invention relates to systems and techniques to determine the proportion of content items used by a generative artificial intelligence (e.g., Latent Diffusion Model or similar) to generate derivative content, thereby enabling attribution (and compensation) to content creators that created the content items used to generate the derivative content.

Description of the Related Art

Generative artificial intelligence (AI) enables anyone (including non-content creators) to instruct the AI to create derivative content that is similar to (e.g., shares one or more characteristics with) (1) content that was used to train the AI, (2) content used by the AI to create the new content, or (3) both. For example, if someone requests that the AI generate an image of a particular animal (e.g., a tiger) in the style of a particular artist (e.g., Picasso), then the AI may generate derivative content based on (1) drawings and/or photographs of the particular animal and (2) drawings of the particular artist. Currently, there is no means of determining the proportionality of the content that the AI used to generate the derivative content and therefore no mechanism to provide attribution (and compensation) to the content creators that created the content used by the AI to generate the derivative content.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some aspects, a server determines that a generative artificial intelligence has generated an initial output based on an initial input that identifies: (1) a type of content to create, (2) a first characteristic associated with the type of content, and (3) a first amount of influence of the first characteristic on the initial output. The server determines an initial output embedding associated with the initial output generated by the generative artificial intelligence. The server determines that the generative artificial intelligence has generated a subsequent output based on a subsequent input that identifies: (1) a second characteristic associated with the type of content, and (2) a second amount of influence of the second characteristic on the subsequent output. The server determines a creator attribution vector that includes one or more creator attributions based at least in part on: (1) the first amount of influence of the first characteristic and (2) the second amount of influence of the second characteristic. The server initiates providing compensation to one or more content creators of the plurality of content creators based on the creator attribution vector.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
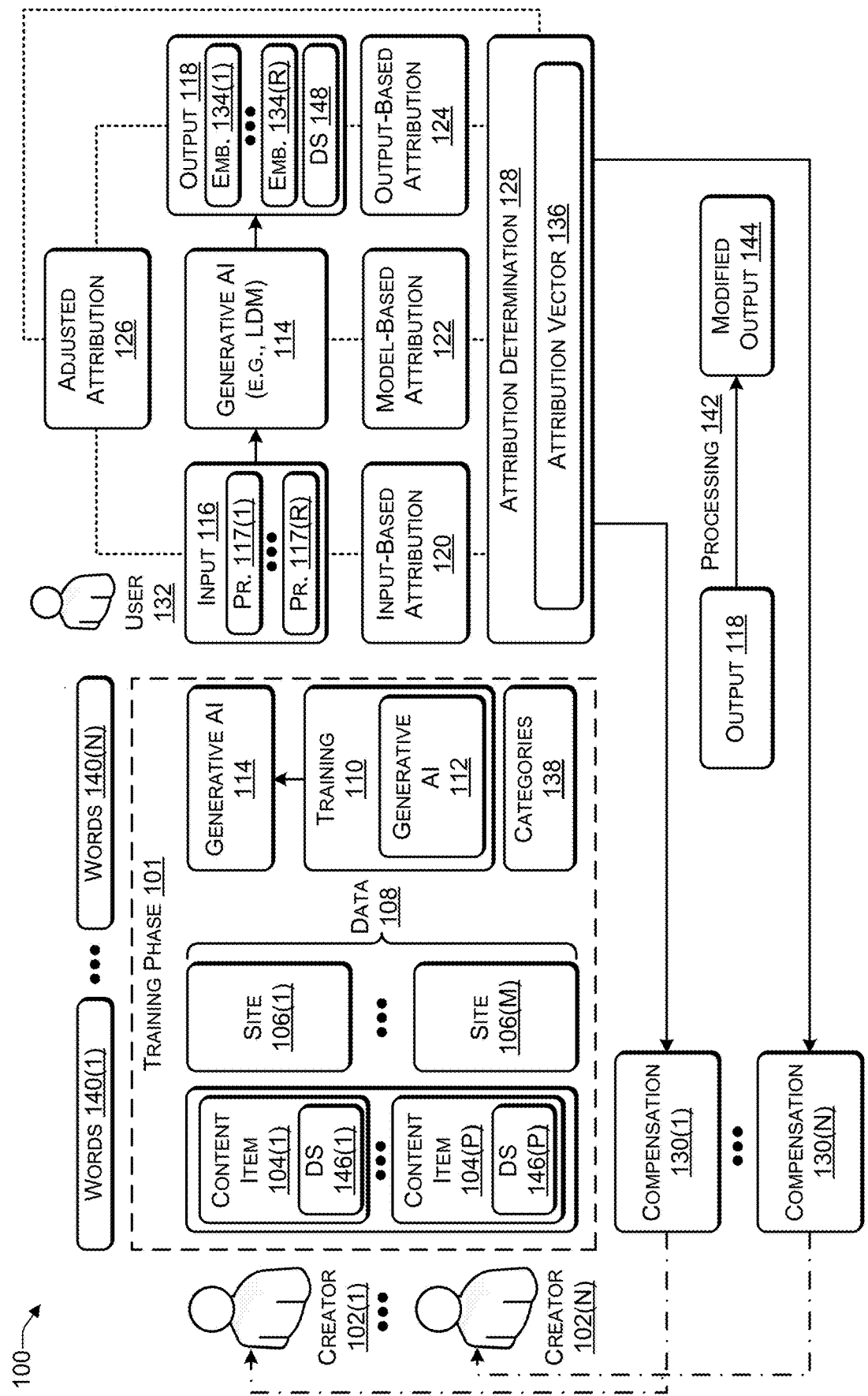
FIG. 1 is a block diagram of a system illustrating different ways to determine an attribution of an output produced by a generative artificial intelligence (AI), according to some embodiments.

With conventional art (e.g., paintings), the term provenance refers to authenticating a work of art by establishing the history of ownership. More broadly, provenance is a set of facts that link the work of art to its creator and explicitly describe the work of art including, for example, a title of the work of art, a name of the creator (e.g., artist), a date of creation, medium (e.g., oil, watercolor, or the like), dimensions, and the like. Generative artificial intelligence (AI), implemented using, for example, a diffusion model or similar AI, may be used to generate digital content. For example, a user (e.g., a secondary creator) may input a text description of the desired digital content to the AI and the AI may generate an output. To illustrate, the input "create a painting of a lion in the style of Picasso" may result in the generative AI creating a digital image that is derived from a photograph or painting of a lion and from the paintings of artist Pablo Picasso. The term provenance, as used herein, is with reference to digital content generated by an AI and includes attribution to one or more content creators.

Terminology

Creator refers to a provider of original content ("content provider"), e.g., content used to train (e.g., fine tune or further train) the generative AI to encourage an "opt-in" mentality. By opting in to allow their original content to be used to train and/or re-train the generative AI, each of the creators receive attribution (and possibly compensation) for derivative content created by the generative AI that has been influenced by the original content of the creators.

User (e.g., a secondary creator) refers to an end user of the generative AI that generates derivative content using the generative AI.

Category refers to one or more characteristics of a content item, either original content or derivative content. For example, categories (characteristics) associated with a work of art may include (1) material applied to a medium, such as pencil (color or monochrome), oil, watercolor, charcoal, mixed materials, or the like, (2) the medium, such as paper, canvas, wood, or the like, (3) the instrument used to apply the material to the medium, such as a brush, a finger, a palette knife, or the like, (4) style, such as renaissance, modern, romanticism, neo-classical, hyper-realism, pop art, or the like, and so on.

Content item refers to original content created by a creator. The content item may include digital content such as, for example, a graphical image, audio content, video content, text-based content, or any combination thereof.

Derivative content refers to output produced by a generative AI in response to input provided by a user.

Embedding refers to a matrix (or a vector) of numbers. An embedding may be used to describe something in terms of other things. For example, derivative content created by a generative AI may include an output embedding that describes the output in terms of creators, content items, categories (e.g., characteristics), or any combination thereof.

The systems and techniques described herein may be applied to any type of generative AI models, including (but not limited to) diffusion models, generative adversarial network (GAN) models, Generative Pre-Trained Transformer (GPT) models, or other types of generative AI models. For illustration purposes, a diffusion model is used as an example of a generative AI. However, it should be understood that the systems and techniques described herein may be applied to other types of generative AI models. A diffusion model is a generative model used to output (e.g., generate) data similar to the training data used to train the generative model. A diffusion model works by destroying training data through the successive addition of Gaussian noise, and then learns to recover the data by reversing the noise process. After training, the diffusion model may generate data by passing randomly sampled noise through the learned denoising process. In technical terms, a diffusion model is a latent variable model which maps to the latent space using, for example, a fixed Markov chain (or another similar mapping). This chain gradually adds noise to the data in order to obtain the approximate posterior $q(x1:T|x0)$, where $x1, \ldots, xT$ are latent variables with the same dimensions as $x0$.

A latent diffusion model (LDM) is a specific type of diffusion model that uses an auto-encoder to map between image space and latent space. The diffusion model works on the latent space, making it easier to train. The LDM includes (1) an auto-encoder, (2) a U-net with attention, and (3) a Contrastive Language Image Pretraining (CLIP) embeddings generator. The auto-encoder maps between image space and latent space. In terms of image segmentation, attention refers to highlighting relevant activations during training. By doing this, computational resources are not wasted on irrelevant activations, thereby providing the network with better generalization power. In this way, the network is able to pay "attention" to certain parts of the image. A CLIP encoder may be used for a range of visual tasks, including classification, detection, captioning, and image manipulation. A CLIP encoder may capture semantic information about input observations. CLIP is an efficient method of image representation learning that uses natural language supervision. CLIP jointly trains an image encoder and a text encoder to predict the correct pairings of a batch of (image, text) training examples. The trained text encoder synthesizes a zero-shot linear classifier by embedding the names or descriptions of the target dataset's classes. For pre-training, CLIP is trained to predict which possible (image, text) pairings actually occurred. CLIP learns a multi-modal embedding space by jointly training an image encoder and text encoder to maximize the cosine similarity of the image and text embeddings of the real pairs in the batch while minimizing the cosine similarity of the embeddings of the incorrect pairings.

A generative AI may be initially trained using open-source data to create a pre-trained (also referred to as a base) AI. The pre-trained AI ("AI") is subsequently trained ("fine-tuned") using training data to create a trained AI (e.g., a generative AI to generate a particular type of content). For example, to create a generative AI that produces digital images in the style of Renaissance artists, the AI may be trained using content items (e.g., digital images of art) created by artists that produced art during the Renaissance period (between approximately 1350 to 1620 AD). As another example, to create a generative AI that produces digital audio in the style of rhythm and blues (R&B) artists in the 1960s, 1970s, and 1980s, the AI may be trained using content items (e.g., digital audio items) created by musicians in the 1960s, 1970s, and 1980s.

The model-based attribution has both an offline phase (e.g., training phase) and an online phase (e.g., generative phase). During the offline phase, a pre-computed attribution model is determined when the pre-trained AI is being trained. During training, the effect of a particular content item on the neural pathways of the neural network of the pre-trained AI may be determined and stored. After the training is complete, the influence of each content creator (that created the content items used to train the AI) may be determined by aggregating the influence of their respective content items on the AI during training. Thus, the influence of content creator XYZ on the machine learning model (e.g., the pre-trained AI) is determined by aggregating the influence of the content items created by XYZ on the pre-trained AI during the training phase. For example, a content creator that contributes a relatively large number of content items and/or content items that vary in style may have more influence on the generative AI than another content creator that contributes a relatively small number of content items and/or whose content items have a very similar style. The online phase occurs after the training phase. In the online phase, the generative AI is online and ready to receive input and generate output (derivative content). The online phase may also be referred to as the generative phase or the inference phase. Both the offline phase and the online phases may be used by the model-based attribution.

The systems and techniques described herein create an attribution vector that identifies the attribution for one or more content creators ("creators") when using adjusted attribution. As used herein, the term 'adjusted attribution' refers to repeatedly adjusting the output of a generative AI based on input (prompts) provided by a user until the user is satisfied with the resulting output. For example, a user may provide a first input, causing the generative AI to generate a first output. Not satisfied with the first output, the user may provide a second input that causes the generative AI to modify the first output based on the second input to create a second output. The user may repeatedly provide additional input that causes the generative AI to make additional modifications to the output until the user is satisfied with the resulting output. The input provided by the user may include one or more creators (e.g., Rembrandt, Picasso, Van Gogh, or the like), one or more styles (e.g., renaissance, modern, romanticism, neo-classical, hyper-realism, pop art, cubist, or the like), one or more types of content (e.g., human, human torso, human head, child, man, woman, a particular animal, or the like), and other types of input intended to modify the output. For example, the user may initially specify input "create a painting of a cat in the style of Renaissance artists." The user may subsequently refine the output by providing additional input, e.g., "make the output image more in the style of Cezanne", and so on.

The systems and techniques described herein enable a user to fine tune the generative process by specifying a desired degree of influence for each content, creator, pool, (style), category on which the generative AI was trained (fine-tuned). The systems and techniques enable a user to edit output by using the generative AI to generate an output and then adjust (modify) synthesis influences in the output by increasing and/or decreasing particular content, creator, pool, (style), category influences. For example, requesting more of a particular creator C22 may cause the systems and techniques to create an embedding E22, which is used as input to the generative AI, which generates output (e.g., derivative content) with a greater influence of creator C22. As another example, the systems and techniques may create a combined attribution vector for style transfer synthesis using content, style, and the like to adjust the attribution vector from input-based, model-based, output-based attribution, or any combination thereof. In this example, one or more elements in the attribution vector corresponding to the creator who created the content, style, and the like may be modified to reflect the creator's influence on the output. The degree of influence of the type of generative AI, the content, the style and the like may be user-adjusted after the initial output has been created. In some cases, the results of the user's adjustments may be displayed substantially in real time, thereby enabling the user to view the result of the user's input (e.g., adjustment) a relatively short time (less than 10 seconds) after providing the input.

For example, a generative AI may output derivative content in response to receiving user input. After reviewing the output, the user may provide additional input requesting greater influence of a particular creator Ci. One way to achieve this is to transfer a style of the particular creator Ci onto the output generated by the AI and update the attribution vector based on a weight of a change to the original output. Another way to achieve this is to create an embedding of each creator (e.g., using Dreambooth or similar) by training ("fine-tuning") the generative AI with the content from each creator, where the caption of each creator is extended with a placeholder word for that creator. During training, the generative AI learns the specific style of each creator Ci that may not have been captured by the caption. The specific style of each creator is condensed into a single point ECi in embedding space. After the training is complete, the generative AI generates an initial output (derivative content) based on an initial user input (prompt). The initial output has an initial image embedding. When the user provides additional input to increase the influence of a particular creator, the systems and techniques add the respective point in embedding space (ECi) to the initial image embedding of the output weighted by a specified (or default) amount. For example, the user may specify in the additional input to "increase the influence of creator X by Y % in the generated output", in which case the weight is determined based on Y %. If the user does not specify Y, then the systems and techniques may use a default amount (e.g., 1%, 2%, 5%, 10%, or the like). Based on the additional input, the generative AI creates new content based on the new embedding which combines the embedding of the initially generated output and the added embeddings of one or more specified creators. If desired, the overall layout of the initially generated output can be kept by starting the diffusion process with that output instead of just noise.

As a first example, a method includes determining, by one or more processors, that a generative artificial intelligence has generated an initial output based on an initial input that identifies: a type of content to create, a first characteristic associated with the type of content, and a first amount of influence of the first characteristic. The method includes determining, by the one or more processors, an initial output embedding associated with the initial output generated by the generative artificial intelligence. The method includes determining, by the one or more processors, that the generative artificial intelligence has generated a subsequent output based on a subsequent input that identifies: a second characteristic associated with the type of content and a second amount of influence of the second characteristic on the subsequent output. For example, the first characteristic and the second characteristic may each include: a name of a particular creator, a style associated with a set of one or more creators, or any combination thereof. In response to receiving the subsequent input, the generative artificial intelligence may create a subsequent creator embedding based at least in part on the subsequent input and generate the subsequent output based at least in part on the subsequent creator embedding. In some cases, the generative artificial intelligence may generate the subsequent output based at least in part on: the subsequent creator embedding and an initial creator embedding created based at least in part on the initial input. In some other cases, the generative artificial intelligence may generate the subsequent output based on the subsequent input by: transferring a particular style of a particular creator identified in the subsequent input and updating the creator attribution vector based on the second amount of influence. The method may include generating a creator embedding for each creator of the plurality of content creators whose content items are used to train the generative artificial intelligence, extending a caption for each creator with a placeholder word associated with each creator, and after the generative artificial intelligence has learnt a specific style of each creator that is not captured by the caption, condensing the specific style to a single point creator embedding in an embedding space. The method may include determining that the subsequent input identifies a particular creator, adding a particular creator embedding associated with the particular creator to a subsequent output embedding associated with the subsequent output with a weight based on the second amount of influence to create a combined embedding, and generating the subsequent output based on the combined embedding. The method includes determining, by the one or more processors, a creator attribution vector that includes one or more creator attributions based at least in part on: the first amount of influence of the first characteristic and the second amount of influence of the second characteristic. The method includes initiating, by the one or more processors, providing compensation to one or more content creators of the plurality of content creators based on the creator attribution vector.

As a second example, a server may include one or more processors and a non-transitory memory device to store instructions executable by the one or more processors to perform various operations. The operations include determining that a generative artificial intelligence has generated an initial output based on an initial input that identifies: a type of content to create, a first characteristic associated with the type of content, and a first amount of influence of the first characteristic on the initial output. The operations include determining an initial output embedding associated with the initial output generated by the generative artificial intelligence. The operations include determining that the generative artificial intelligence has generated a subsequent output based on a subsequent input identifying: a second characteristic associated with the type of content and a second amount of influence of the second characteristic on the subsequent output. The operations include determining a creator attribution vector that includes one or more creator attributions based at least in part on: the first amount of influence of the first characteristic and the second amount of influence of the second characteristic. The operations include initiating providing compensation to one or more content creators of the plurality of content creators based on the creator attribution vector. The operations may include determining, using automatic caption generation, a prompt guidance comprising a set of words that describes: one or more styles, one or more concepts, one or more types of content, or any combination thereof associated with individual creators of the plurality of content creators. The operations may include determining an initial prompt guidance associated with the initial input, determining a subsequent prompt guidance associated with the subsequent input, and determining a weighted sum of: the initial prompt guidance weighted based on the first amount of influence and the subsequent prompt guidance weighted based on the subsequent amount of influence. The operations may include performing a first set of steps of a latent diffusion model used by the generative artificial intelligence based at least in part on the initial prompt guidance and performing a second set of steps of the latent diffusion model based at least in part on the subsequent prompt guidance. The first set of steps may be determined based at least in part on the first amount of influence and the second set of steps determined based at least in part on the subsequent amount of influence. The output produced by the generative artificial intelligence may include: a digital image having an appearance of a work of art, a digital visual image, a digital representation of a book, a digital music composition, a digital video, or any combination thereof. In some cases, the generative artificial intelligence may generate the subsequent output based on the subsequent input by: transferring a particular style of a particular creator identified in the subsequent input and updating the creator attribution vector based on the second amount of influence.

As a third example, a non-transitory computer-readable memory device used to store instructions executable by one or more processors may perform various operations. The operations include determining that a generative artificial intelligence has generated an initial output based on an initial input identifying: a type of content to create, a first characteristic associated with the type of content, and a first amount of influence of the first characteristic on the initial output. The operations include determining an initial output embedding associated with the initial output generated by the generative artificial intelligence, determining that the generative artificial intelligence has generated a subsequent output based on a subsequent input that identifies: a second characteristic associated with the type of content and a second amount of influence of the second characteristic on the subsequent output. The operations include determining a creator attribution vector that includes one or more creator attributions based at least in part on: the first amount of influence of the first characteristic and the second amount of influence of the second characteristic. The operations include initiating providing compensation to one or more content creators of the plurality of content creators based on the creator attribution vector. Based at least in part on determining that the type of content comprises digital video content that includes a plurality of frames, the operations may include: (i) creating a plurality of frame embeddings using a Contrastive Language Image Pretraining (CLIP) embedding generator, where individual frame embeddings of the plurality of frame embeddings corresponding to individual frames of the plurality of frames, (ii) clustering, along a temporal axis associated with the video content, sequential frames based on the plurality of frame embeddings to create a plurality of clusters of frames, and (iii) determining the creator attribution vector based on the plurality of clusters of frames. Based at least in part on determining that the type of content comprises digital music content that includes a plurality of stems, the operations may include creating a plurality of stem embeddings using a Contrastive Language Audio Pretraining (CLAP) embedding generator. Individual stem embeddings of the plurality of stem embeddings correspond to individual stems of the plurality of stems. The operations may include determining the creator attribution vector based on the plurality of stems. For example, the plurality of stems may comprise either: (i) a vocal stem and at least one instrument stem or (ii) a plurality of instrument stems. Based at least in part on determining that the type of content comprises a digital representation of a book that includes a plurality of sentences, the operations may include creating a plurality of sentence embeddings using a Contrastive Language Image Pretraining (CLIP) embedding generator. Individual sentence embeddings of the plurality of sentence embeddings correspond to individual sentences of the plurality of sentences. The operations may include clustering sequential sentences based on the plurality of sentence embeddings to create a plurality of clusters of sentences and determining the creator attribution vector based on the plurality of clusters of sentences. The operations may include performing a first set of steps of a latent diffusion model used by the generative artificial intelligence based at least in part on the initial prompt guidance and performing a second set of steps of the latent diffusion model based at least in part on the subsequent prompt guidance. The first set of steps may be determined based at least in part on the first amount of influence and the second set of steps may be determined based at least in part on the subsequent amount of influence. The output produced by the generative artificial intelligence may include a digital image having an appearance of a work of art, a digital visual image, a digital representation of a book, a digital music composition, a digital video, or any combination thereof FIG. 1 is a block diagram of a system 100 illustrating different ways to determine attribution of an output produced by a generative artificial intelligence (AI), according to some embodiments. Before a generative AI is deployed, the generative AI undergoes a training phase (also referred to as fine tuning) 101 in which the generative AI is trained to produce a particular type of content. Typically, a generative AI comes pre-trained (e.g., using publicly available training data) and then undergoes further training (fine tuning) with a particular type of content (e.g., digital image, music, text-based fiction book, or the like) to enable the generative AI to generate the particular type of content.

Multiple creators 102(1) to 102(N) (N>0) may create content items 104(1) to 104(P) (P>0). The content items 104 may include, for example, digital artwork (including original digital artwork and original artwork that has been digitized), digital images (e.g., photographs), digital music, digital text-based content (e.g., eBooks), digital video, another type of digital content, or any combination thereof. In some cases, at least a portion of the content items 104 may be accessible via one or more sites 106(1) to 106(M) (M>0). For example, the creators 102 may upload one or more of the content items 104 to one or more of the sites 106 to make the content items 104 available for acquisition (e.g., purchase, lease, or the like). The content items 104 may be copied (e.g., via a web crawler or the like) from the sites 106 or links obtained and used as training data 108 to perform training 110 of a generative artificial intelligence 112 to create a generative AI 114 (e.g., trained). The generative AI 114 may be a latent diffusion model or another type of generative AI. A generative AI, such as the AI 112, typically comes pre-trained (e.g., using open-source data), after which further training (the training 110) is performed to create the generative AI 114. For example, when the training 110 uses data 108 that includes images of paintings, then the pre-trained AI 112 may be trained to generate images of paintings, when the training 110 uses rhythm and blues songs, then the pre-trained AI 112 may be trained to create the AI 114 that generates rhythm and blues songs, when the training 110 uses science fiction novels, then the pre-trained AI 112 may be trained to create the AI 114 that generates science fiction novels, and so on. To illustrate, the AI 112 may be a pre-trained model $SD_{BASE}$, such as LAION (Large-scale Artificial Intelligence Open Network or another generative AI model) that is trained using open-source datasets. Using the content items 104, the model $SD_{BASE}$ is tuned to create the generative AI 114, e.g., $SD_{TUNED}$. For example, the generative AI 114 may be tuned to generate a particular type of derivative content, such as, for example, digital images of artwork, digital images of photos, digital music in a particular style, or the like. During the training phase 101, categories 138 associated with the training data 108 (e.g., the content items 104) may be identified. For example, for artwork, the categories 138 may identify the main colors (e.g., red, blue, green, and the like) present in the training data 108, the high-level content (e.g., portrait, landscape, or the like) present in the training data 108, the content details (e.g., human, animal, furniture, jewelry, waterfall, river, ocean, mountain(s), or the like) present in the training data 108, the style (renaissance, modern, romanticism, neo-classical, hyper-realism, pop art, or the like) in the training data 108, and so on.

After the generative AI 114 has been created via the training 110, a user, such as a representative user 132 (e.g., a secondary creator), may use the generative AI 114 to generate derivative content, such as output 118. For example, the representative user 132 may provide input 116, such as input, e.g., "create <content type><content description> similar to <creator identifier>". In this example, <content type> may include digital art, digital music, digital text, digital video, another type of content, or any combination thereof. The <content description> may include, for example, "a portrait of a woman with a pearl necklace", "a rhythm and blues song", "a science fiction novel", "an action movie", another type of content description, or any combination thereof. The <creator identifier> may include, for example, "Vermeer" (e.g., for digital art), "Aretha Franklin" (e.g., for digital music), "Isaac Asimov" (e.g., for science fiction novel), "James Cameron" (e.g., for action movie), or the like. The input 116 may be text-based input, one or more images (e.g., drawings, photos, or other types of images), or input provided using one or more user-selectable settings.

Based on the input 116, the generative AI 114 may produce the output 118. For example, the output 118 may include digital art that includes a portrait of a woman with a pearl necklace in the style of Vermeer, digital music that includes a rhythm and blues song in the style of Aretha Franklin, a digital book that includes a science fiction novel in the style of Isaac Asimov, a digital video that includes an action movie in the style of James Cameron, and so on. The input 116 may be converted into an embedding to enable the generative AI 114 to understand and process the input 116.

Attribution for the derivative content in the output 118 may be performed in one of several ways. Input-based attribution 120 involves analyzing the input 116 to determine the attribution of the output 118. Model-based attribution 122 may create an attribution vector 136 that specifies a percentage of influence that each content item, content creator, and/or category had in the training of the generative AI 114. For example:

Vector 136={SC1,SC2, . . . SCn} where $SC_i$ ($0<i<=n$) is a distance (e.g., similarity) of the content created by Creator 102(i) to the output 118 determined based on an analysis of the input 116. A distance between two items, such as a generated item and a content item, is a measure of a difference between the two items. As distance decreases, similarity between two items increases and as distance increases, similarity between two items decreases. For example, if a distance d between two items I1 and I2 is less than or equal to a threshold T, then the items are considered similar and if d>T, then the items are considered dissimilar. Output-based attribution 124 involves analyzing the output 118 to determine the main X (X>0) influences that went into the output 118. Adjusted attribution 126 involves manual fine tuning of the generative process by specifying a desired degree of influence for each content item, creator, pool, category (e.g., the data 108) that the generative AI 114 was trained on. Adjusted attribution 126 enables the user 132 to adjust the output 118 by modifying an amount of influence provided by individual content item, creators, categories, and the like. For example, adjusted attribution 126 enables the user 132 to increase the influence of creator 102(N), which causes the generative AI 114 to generate the output 118 that includes content with a greater amount of content associated with creator 102(N).

One or more of: (i) the input-based attribution 120, (ii) the model-based attribution 122, (iii) the output-based attribution 124, (iv) the adjusted attribution 126, or (v) any combination thereof may be used by an attribution determination module 128 to determine an attribution for the content creators 102 that influenced the output 118. In some cases, the attribution determination 128 may use a threshold to determine how many of the creators 102 are to be attributed. For example, the attribution determination 128 may use the top X (X>0), such as the top five, top 8, top 10, or the like influences, to determine which of the creators 102 influenced the output 118 and are to be attributed. As another example, the attribution determination 128 may identify one or more of the creators 102 that contributed at least a threshold amount, e.g., Y %, such as 5%, 10%, or the like. In this way, if the influence of a particular creator 102 is relatively small (e.g., less than a threshold amount), then the particular creator 102 may not receive attribution. The attribution determination module 128 may determine attribution that is used to provide compensation 130 to one or more of the creators 102. For example, attribution determination module 128 may determine that a first creator 102 is to be attributed 40%, a second creator 102 is to be attributed 30%, a third creator 102 is to be attributed 20%, and a fourth creator is to be attributed 10%. The compensation 130 provided to one or more of the creators 102 may be based on the attribution determination. For example, the compensation 130 may include providing a statement accompanying the output 118 identifying the attribution ("this drawing is influenced by Vermeer", "this song is influenced by Aretha", "this novel is influenced by Asimov", and so on), compensation (e.g., monetary or another type of compensation), or another method of compensating a portion of the creators 102 whose content items 104 were used to generate the output 118.

The generative AI 114 may be trained using images of a particular person (or a particular object) and used to create new images of that particular person (or particular object) in contexts different from the training images. The generative AI 114 may apply multiple characteristics (e.g., patterns, textures, composition, color-palette, and the like) of multiple style images to create the output 118. The generative AI 114 may apply a style that is comprehensive and includes, for example, categories (e.g., characteristics) such as patterns, textures, composition, color-palette, along with an artistic expression (e.g., of one or more of the creators 102) and intended message/mood (as specified in the input 116) of multiple style images (from the training data 108) onto a single content image (e.g., the output 118). Application of a style learned using private content (e.g., provided by the user 132) may be expressed in the output 118 based on the text included in the input 116. In some cases, the output 118 may include captions that are automatically generated by the generative AI 114 using a machine learning model, such as Contrastive Language-Image Pre-Training (CLIP), if human-written captions are unavailable. In some cases, the user 132 (e.g., secondary creator) may instruct the generative AI 114 to produce a 'background' of an image based on a comprehensive machine-learning-based understanding of the background of multiple training images to enable the background to be set to a transparent layer or to a user-selected color. The generative AI 114 may be periodically retrained to add new creators, to add new content items of creators previously used to train the generative AI 114, and so on.

The output 118 may include an embedding 134 (created using an encoder, such as a transformer). The embedding 134 may be a set of numbers, arranged in the form of a matrix (or a one-dimensional matrix, which is sometimes referred to as a vector). Each component of the vector (or matrix) may identify a particular category (e.g., characteristic) expressed in the input 116. To illustrate, a first component of the vector may specify a content type (e.g., digital image, digital music, digital book, or the like), a second component may specify a creator style (e.g., Picasso, Rembrandt, Vermeer, or the like), a third component may specify a painting style (e.g., impressionist, realist, or the like), a fourth component specify a component of the output (e.g., man, woman, type of animal, or the like), and so on. The output 118 may be relatively high resolution. For example, for digital audio, the resolution may be 16 bit or 24 bit sampling at 44 Kilohertz (kHz), 96 kHz, or 192 kHz sampling rate, digital stream direct (DSD) at 2.8224 Megahertz (MHz), or higher. As a further example, for digital video, the resolution may be 1080p (1 k), 4 k, 8 k, or higher. As another example, for digital images, the resolution may be 512 pixels (px), 768 px, 2048 px, 3072 px, or higher and may be square or non-square (e.g., rectangular). To illustrate, the user 132 may specify in the input 116 as a ratio of the length to width of the output 118, such as 3:2, 4:3, 16:9, or the like, the resolution (e.g., in pixels) and other output-related specifications. In some cases, the output 118 may apply a style to videos with localized synthesis restrictions using a prior learned or explicitly supplied style.

The model-based attribution 122 may create the attribution vector 136 for content generation of the generative AI 114, which may be an "off the shelf" LDM or an LDM that has been trained (fine-tuned) specifically for a particular purpose. The attribution vector 136 specifies the percentage of influence that each content item, creator, pool, category had in the creation of the generative AI 114 (e.g., LDM). The model-based attribution 122 may create an output-based attribution vector for the output 118 with a specific text t as input 116. In some cases, the attribution vector may specify the percentage of influence that each content item, creator, pool, category had in the creation of the output 118 based on the specific text in the input 116.

The input-based attribution 120 may create an input-based attribution vector 136 for a specific output 118, e.g., generated content, that was generated by providing text t as input 116. The attribution vector 136 specifies the percentage of relevance each content item, creator, pool, category has based on the input 116. The input 116 may reveal influences, regardless of the type of generative model used to generate the output 118. The input-based attribution 120 may analyze the input 116 to identify various components that the generative AI 114 uses to create the output 118. First, the input-based attribution 120 may analyze the input 116 to determine creator identifiers (e.g., creator names) that identify one or more of the creators 102. For example, if a particular creator of the creators 102 (e.g., Picasso, Rembrandt, Vermeer, or the like for art) is explicitly specified in the input 116, then the bias of the particular creator is identified by adding the particular creator to the attribution vector 136. Second, the input-based attribution 120 may analyze the input 116 to determine one or more categories, such as specific styles, objects, or concepts, in the input 116. The input-based attribution 120 may determine a particular category in the input 116 and compare the particular category with categories included in descriptions of individual creators 102. To illustrate, if the input 116 has the word "dog" (a type of category), then "dog" (or a broader category, such as "animal") may be used to identify creators 102 (e.g., Albrecht Durer, Tobias Stranover, Carel Fabritius, or the like) who are described as having created content items 104 that include that type of category (e.g., "dog" or "animal"). To enable such a comparison, a description Dj is created and maintained for each creator Cj, where each description contains up to k (k>0) categories. The description may be supplied by the creator or generated automatically using a machine learning model, such as CLIP, to identify which categories are found in the content items 104 created by the creators 102. The descriptions of creators 102 may be verified (e.g., using a machine learning model) to ensure that the creators 102 do not add categories to their descriptions that do not match their content items 104. Third, the input-based attribution 120 may determine the embedding 134. To generate the output 118 from the input 116, the input 116 (e.g., text t) may be embedded into a shared language-image space using a transformer to create the embedding 134 (Et). The embedding 134 (Et) may be compared to creator-based embeddings ECi to determine the distance (e.g., similarity) of the input 116 to individual creators 102. A distance measurement (e.g., expressing a similarity) may be determined using a distance measure Di, such as cosine similarity, contrastive learning (e.g., self-supervised learning), Orchini similarity, Tucker coefficient of congruence, Jaccard index, Sorensen similarity index, or another type of distance or similarity measure. In some cases, the resulting input-based attribution 120 may be combined with the attribution of the output 118 Ot which is generated from the embedding 134 (Et) using the input text t using a transformer T. At an output-level, the embeddings ECi may be compared to the training data 108.

The adjusted attribution 126 enables the user 132 (e.g., secondary creator) to re-adjust the generative process, when creating the output 118, by specifying a desired degree of influence for each content item, creator, pool (of content items), category (of content items) in the training data 108 that was used to train the generative AI 114. This enables the user 132 to "edit" the output 118 by repeatedly adjusting the content used to create the output 118. For example, the user 132 may adjust the attribution by increasing the influence of creator 102(N) and decreasing the influence of creator 102(1) in the output 118. Increasing creator 102(N) results in instructing the generative AI 114 to increase an embedding of creator 102(N) in the output 118, resulting in the output 118 having a greater attribution to creator 102(N). For example, the user 132 may provide input 116 that includes a first prompt 117(1), causing the generative AI 114 to produce the output 118 having a first embedding 134(1). The user 132 may provide one or more additional prompts, such as a representative prompt 117(R) (R>0), causing the generative AI 114 to produce the output 118 having an embedding 134(R). The user 132 may repeatedly view the output 118 and provide the prompts 117(1) to 117(R) until the user 132 is satisfied with the resulting output 118.

The output-based attribution 124 creates an output-based attribution vector 136, e.g., for style transfer synthesis and for using the content and style images to adjust the attribution vector, e.g., by increasing the element in the attribution vector corresponding to the creator 102 who created the style images. The degree of influence for the generative AI 114 may also be manually adjusted, as described herein, using the adjusted attribution 126. The embedding 134 may include information identifying (1) one of more of the content creators 102 whose content items 104 are included in the output 118, (2) one or more of the content items 104 included in the output 118, (3) one or more of the categories 138 included in the output 118, or (4) any combination thereof. The output-based attribution 124 may use the embedding 134 to create the attribution vector 136.

Output-based attribution 124 may be performed (i) by comparing creator embeddings of individual creators 102 to the embedding 134 (e.g., where the embedding 134 identifies individual creators 102 used to create the output 118) to determine the attribution vector 136, (ii) by comparing embeddings of the content items 104 with the embedding 134 (e.g., where the embedding 134 identifies individual content items 104 used to create the output 118) to determine the attribution vector 136, (iii) by comparing content embeddings of characteristics of the content items 104 with the embedding 134 (e.g., where the embedding 134 identifies characteristics of individual creators 102 used to create the output 118) to determine the attribution vector 136, or (iv) any combination thereof. For example, the embedding 134 may identify: (i) the individual creators 102 whose content items were used to create the output 118, (ii) the content items 104 used to create the output 118, (iii) categories (e.g., characteristics), or (iv) any combination thereof.

Category-Based Attribution

In addition to enabling the user 132 to adjust the influence of specified (particular) creators 102, the adjusted attribution 126 enables the user 132 to adjust the influence based on categories that the user 132 specifies in the input 116 (e.g., the prompts 117(1) to 117(R)). For example, the style of the output 118 may be adjusted to be more similar to creator 102(A) (1<=A<=N), while the subject in the output 118 may be adjusted to be more similar to creator 102(B) (1<=B<=N, B different than A). In some cases, the user 132 may specify a particular iteration during the diffusion process to increase the similarity to a particular one of the creators 102. For example, a first set of iterations may be used to define the content, while a subsequent set of iterations may adjust a style, a texture, or other characteristic of the output 118. To illustrate, the influence of a particular creator 102 on a particular category may be adjusted when a unique identifier associated with the creator is to be used during the generative process by the generative AI 114. For example, the prompt 117(1) that includes "A dog in the style of artist A1 and in the style of artist A2" does not specify what particular characteristics of artist A1 and of artist A2 are to be used to generate the output 118. However, the user may refine the prompt 117(1) (or provide a subsequent prompt) by specifying "A dog in the style of artist A1 and in a medium similar to artist A2". In the refined prompt, "in the style of artist A1" may be used earlier (e.g., steps 0 to 10) in the diffusion process while "in a medium similar to artist A2" may be used later (e.g. steps 40 to 50) in the diffusion process. By default, the order in which particular ones of the creators 102 are specified in the prompt 117 may determine when in the diffusion process they are used. Of course, the user 132 may override the default order by specifying a particular order in the prompt 117 or by providing multiple prompts 117(1) to 117(R), e.g., a first prompt that includes "A dog in the style of artist A1" followed by a second prompt that includes "Modify the output to be in a medium similar to artist A2".

Creator Guidance

After receiving the initial prompt 117(1) and producing the initial output 118 (and corresponding initial embedding 134(1)), the adjusted attribution 126 may receive additional prompts 117. In response, the adjusted attribution 126 may modify the initial embedding 134(1) by adding a particular amount of influence of one or more additional creators 102 specified in the additional prompts 117. The one or more additional creators 102 are given a particular amount of attribution based on the amount of influence added. The resulting modified output 118 is attributed a given percentage to the one or more additional creators 102. For example, the user 132 provides the initial prompt 117(1) and, in response, the generative AI 114 produces the initial output 118 having the embedding 134(1). In response to the user 132 providing an additional prompt 117(R), the generative AI 114 may obtain an embedding associated with a particular creator specified in the additional prompt 117(R) and combine the two embeddings (the embedding 134(1) and an embedding associated with a creator 102 specified in the additional prompt 117(R)) in a weighted sum. If the resulting modified embedding is weighted with w=1.0, the attribution determination 128 is performed as described herein. If the weight is w=0.5, the additional creator embedding constitutes 50% of the resulting modified embedding, and thus the attribution of the creator specified in the additional prompt 117(R) is approximately 50%.

Prompt Guidance

In addition to adding the embedding of a creator 102 to the prompt 117(1), the adjusted attribution 126 may adjust the attribution vector 136 of the output 118 by adjusting the prompt 117(1). For example, for each creator 102, the generative AI 114 determines a set of words (e.g., a sentence) 140 that describes the core style, concepts, content, and other characteristics of each creator 102. For example, the set of words 140(1) may be associated with the creator 102(1) and the set of words 140(N) may be associated with the creator 102(N). The set of words 140 may be created using, for example, automatic caption generation or by using an LLM (e.g., GPT3 or similar) to analyze existing captions. The set of words 140 may include one (or more) sentences that summarize the multiple captions of the content items associated with (e.g., created by) each creator 102. The set of words 140 may be referred to as "prompt guidance" (PG), since set of words 140 may be used to guide a prompt 117 towards a particular creator 102. An embedding E_PG of the prompt guidance may be generated using a text encoder. During generation (inference) of the output 118, the user 132 provides the prompt p, which is used to create an embedding E_P. Based on a desired adjusted attribution factor w (weight) for a particular creator 102, E_PG is added to E_P to obtain E_P'=(1−w)*E_P+w*E_P'

This results in modifying the prompt 117 towards the appropriate embedding space for the current creator 102, by an amount w that the user 132 may specify in the input 116. For example, assume creator A always paints red and white dogs in a cubist style. To guide the generative AI 114 towards the embedding of creator A, the prompt guidance may include "cubist painting of red and white animal". If the user 132 enters the prompt 117 "painting of a cat" and selects creator A as the desired style and specifies a weight of 0.6, the generative AI 114 may use a mixed embedding that consists of 40% "painting of a cat in the style of A" and of 60% "cubist painting of red and white animal". This way, the prompt 117 is guided towards the appropriate embedding area, while the style of A is still used, so that the user 132 receives a cat painting in the red and white cubism style of creator A.

Adjusting the Attribution of Multiple Creators

For category-based post processing, the synthesis process of the generative AI 114 may be changed at particular diffusion iteration steps. This process may be used to adjust the attribution of multiple creators 102 using prompt guidance based on the prompts 117. For example, two creators A1 and A2 may have corresponding prompt guidance words PG1 and PG2, respectively. If the user 132 desires that both creators be included in the output 118, the user 132 may enter a prompt p such as "a painting of a cat in the style of A1 and A2". Additionally, the user 132 may include a weight w1 for A1 and a weight w2 for A2. Using a prompt that includes the weights w1 and w2 and the guidance embeddings E_PG1 and E_PG2, the generative AI 114 may generate two prompt embeddings E_P1 and E_P2' with the weighted average formula described earlier. The generative AI 114 may use E_P1 for a first set of diffusion steps (e.g. for steps 1 to 10). The switching point may be (1) manually specified, (2) derived by the generative AI 114 from the weights w1 and w2, or (3) may default to 50% of the overall number of diffusion steps. Of course, the percentage may vary based on the number of creators, with 3 creators defaulting to 33% weight, 4 creators defaulting to 25% weight, and so on. After the switching point, the remaining diffusion steps may use E_P2' for synthesis. This results in output that is guided both towards the embedding space of AI and of A2. Depending on the relative size of weight w1 to w2, the resulting image is closer to AI or to A2, and depending on the absolute values of w1 and w2, the image is closer to the creators or closer to the original prompt p.

Human Perception Tuning

In some cases, the attribution determination algorithm 128 may be adjusted by changing the weights with which the input-based attribution 120, the model-based attribution 122, and the output-based attribution 124 are combined. For example, human opinion scores may be used to rank the attribution of creators 102, as perceived by humans. To do this, new content items are created in the style of individual creators 102. For each pair of the new content items, human subjects are asked to indicate which of the new content items are most influenced by a particular creator 102. After each new content item pair is ranked a large number of times (e.g., by a large number of humans, such as thousands, hundreds of thousands, or millions of humans), an influence score is determined for each new content item. To enable the attribution algorithm to match human perception as closely as possible, the three attribution values attr_i (input-based), attr_m (model-based), and attr_o (output-based) may be determined for each content item. Then, the corresponding influence value i_perception, as determined by human perception, is used as a ground truth value for creator influence. Linear regression may be used to map the sum of attribution values to i_perception, such that the equation a*attr_i+b*attr_m+c*attr_o=i_perception is fulfilled as closely as possible for all images. In terms of a metric for visual perception, the prompts from the PartiPrompts set may be used as a baseline. For each creator 102, "in the style of <creator X>" may be added to each prompt, where X is the name of the respective creator 102. After a benchmark data set has been generated, a human score of the attribution may be determined for each new content item.

Video Attribution

The three attribution values from the input-based attribution 120, the model-based attribution 122, and the output-based attribution 124 may be used in cases where the content items 104 include video. As used herein, the term video includes one or more associated audio tracks. Because a video may include different scenes, where each scene may have a different copyright influence, simply averaging the three values (from the input-based attribution 120, the model-based attribution 122, and the output-based attribution 124) to obtain a single value may be insufficient. To address the multiple scenes and multiple influences, a video may be segmented into visually cohesive scenes. This may be determined by embedding all frames, e.g. using Contrastive Language Image Pre-training (CLIP), and clustering the embeddings along the temporal axis using, for example, kNN clustering, k-means clustering, or another clustering technique. Each cluster of sequential frames comprises a visually cohesive scene ("scene"). The generative AI 114 may be used to determine the attribution of each scene. While each scene is visually cohesive, in some cases, individual frames may have a higher influence of certain creators than other frames. To account for this, the generative AI 114 may determine the attribution of several key frames. This may be one frame per second, two frames per second, or even all frames. In addition, if any cluster is above a predetermined threshold, the clustering algorithm may be run on that cluster again, obtaining multiple shorter clusters below the determined duration threshold. The attribution values obtained for all key frames within each cluster may be averaged to determine a temporal attribution vector, with one attribution value per cluster. The resulting attribution vector may be weighted with the duration of each cluster to obtain the overall attribution of each creator on the video. The creators 102 may be compensated either by scene, or by averaging over all scenes.

Text Verification

Determining a sequence of attribution values instead of a single value also applies to text. For example, the input-based attribution 120, the model-based attribution 122, and the output-based attribution 124 may be determined for each sentence in content items that include text (e.g., an eBook), similar to the scenes in video, to determine a sequential attribution vector. Each individual sentence may be attributed to a particular creator or sentences may be grouped based on whichever creator had the largest influence on them. This way, the sentences in the text may be attributed to individual creators, even if the influence of individual creators is scattered across multiple sentences, with the sentences in-between influenced by other creators.

Data Set Verification

In addition to attribution to individual creators 102, the output of the input-based attribution 120, the model-based attribution 122, and the output-based attribution 124 may be used to group the influences of the creators 102 together based on the data set to which each creator belongs. For example, if ten artists belong to a particular artist collective, the contribution of the ten artists together constitutes the attribution to the data set that the particular artist collective provided during the training phase 101. Further, if public content items having a free commercial license were used during the training phase 101, the attribution to these content items may be grouped together to identify the overall influence of the data set when the generative AI 114 generates the output 118.

Music Attribution

In addition to attribution for text and video, the adjusted attribution 126 can create attribution for content items 104 that include music by extending the framework beyond the three attribution values of the input-based attribution 120, the model-based attribution 122, and the output-based attribution 124. For example, for musical content items 104, each content item 104 may be divided into stems (e.g., components), such as vocals, each individual instrument (e.g., bass, guitar, keyboards, drums, percussion, brass, and the like), background vocals, and so on. In this way, each music piece may be broken down into multiple pieces that together create the musical arrangement of the music content item 104. For individual content items 104, the adjusted attribution 126 may be calculated separately. Because each musical content item 104 is a sequence of frequencies, the adjusted attribution 126 may determine the attribution vector 136 for each stem. To do this, each piece may be grouped into acoustically cohesive segments using an audio embedder, such as Contrastive Language-Audio Pretraining (CLAP). The embeddings may be clustered along the temporal axis using, for example, kNN clustering, k-means clustering, or another clustering technique. For example, a song that has two singers, two guitars, a bass, and drums, results in six temporal attribution vectors. The adjusted attribution 126 may either (i) average the temporal attribution vectors to obtain an overall temporal attribution vector or (ii) determine an average of each individual temporal attribution vector to create six distinct attribution values for the multiple stems. The creators 102 (e.g., musicians) may be provided the compensation 130 either (i) for the overall piece, (ii) for their contribution to the individual stem, or (iii) for their contribution to each segment of the song.

Updating Attribution

In some cases, the attribution may change due to post processing 142 of the output 118 to create modified output 144. For example, for a digital image (or a sequence of images, such as a video), the post processing 142 may include upscaling, inpainting, style transfer, color adjustments, another type of post processing, or any combination thereof. If the output 118 is modified to create the modified output 144, the attribution may change. In such cases, after the post processing 142 is completed, the attribution determination 128 may determine how much the output 118 has changed by performing a comparison between the output 118 and the modified output 144. If the post processing 142 changed the output 118 by more than a predetermined percentage (e.g., 2%, 5%, 10%, or the like), the attribution determination 128 may determine the attribution vector 136 using the modified output 144 rather than the output 118. For example, the post processing 142 may result in emphasizing the influence of creator C1 and deemphasizing the influence of creator C2. In this example, the attribution determination 128 may analyze the modified output 144 and create the attribution vector 136 in which creator C1 is given greater attribution and creator C2 is given less attribution, as compared to when the output 118 is analyzed. In this way, the effect of the post processing 142 on the output 118 may be taken into account. If the predetermined percentage is set to 0%, then the attribution determination 128 may analyze the modified output 144 (rather than the output 118) to create the attribution vector 136.

Ensuring Transformativeness

The adjusted attribution 126 may be used to determine that the AI-generated output 118 is sufficiently transformative. For example, the adjusted attribution 126 may compare the output 118 to the training data 108 using either the attribution of the individual training content item 104 in the training data 108 or by determining a similarity score of the output 118 for each content item 104 in the training data 108. To illustrate, the similarity score may be a cosine similarity of CLIP or CLAP embeddings. If the similarity score is above a predetermined percentage threshold (e.g., 90%, 95%, 98% 99%, or the like), the transformativeness of the generated output 118 may be undesirable. To achieve a desirable (e.g., guaranteed) transformativeness, the adjusted attribution 126 may be used to reduce the attribution of the largest percentage influence in the output 118. For example, if the output 118 is not transformative, e.g., the output 118 is N % (N>90, 95, 98, 99 or the like) similar to a particular one of the content items 104, then the attribution determination 128 is able to determine which particular creator 102 is associated with the particular content item 104 that is very similar to the output 118. By reducing the embedding of the particular creator 102, weighted by a desired amount, from the embedding 134 of the output 118, the generative AI 114 may be used to generate new output 118 based on the updated embedding 134. By moving the output 118 further away from the particular creator 102 that had the highest influence, the output 118 becomes more transformative. The resulting output 118 may be analyzed as before to determine whether the output 118 is sufficient transformative and if it is not sufficiently transformative, then the new output 118 may be moved away from the current highest influence. This process may be repeated until the largest similarity to any creator 102 is below the predetermined threshold.

Temporal Attribution Tracking

In some cases, multiple of the outputs (including the output 118) generated by the generative AI 114 may be used for training, e.g., to train a second generation ("gen") AI. In such cases, each of the multiple outputs may include the influence of multiple creators 102. Content generated by the second gen AI, that was trained using derivative content (such as the output 118), may be influenced by at least a portion of the creators 102 whose content 104 was used to train the generative AI 114. For example, assume the AI 114 is trained using images of Picasso and images of van Gogh and assume the output 118 generated by the AI 114 has an attribution of 10% to Picasso and 20% to van Gogh. Assume also that the output 118 is included in a second set of training data used to train a second gen AI, which generates a second output. Assume that the attribution of the output 118 to the second output is 50%. Even though the second gen AI was trained using AI-generated images, such as the output 118, each output generated by the second gen AI continues to be influenced by the content items 104 of the human creators 102 that were used to train the AI 114. Thus, in this example, an attribution determination of the second output generated by the second gen AI may determine an attribution of 5% to Picasso and 10% to van Gogh. This process of tracking the attribution of the original creators 102 may be continued over time, e.g., across multiple generations of AI and training data. To enable temporal attribution tracking (over successive generations) based on the content items 104, a type of digital fingerprinting, such as use of a digital signature 146, may be included with each content item 104. For example, the digital signature 146 may be added to metadata associated with content items 104. To illustrate, the digital signature 146 may be added as an invisible watermark to digital images or to digital videos. Content items 104 created by human creators 102 may include the digital signature 146 indicating an attribution of 100% to the copyright holder of each of the content items 104. The digital signature 146 may be added to individual the output 118 generated by the AI 114 is provided a digital signature 148 that includes attribution information and other metadata. The digital signature 148 may be added as an invisible watermark or included in metadata associated with digital content. In the previous example that used Picasso and van Gogh, each of the original training images (training data 108) may include digital signatures describing attributions of 100% to either Picasso or van Gogh. The output 118 tis provided the digital signature 148 indicating the 10% attribution to Picasso and the 20% attribution to van Gogh. Thus, the digital signature 148 associated with derivative output 118 may be used to store the attribution vector 136. If the output 118 is later used as training data, the digital signature 148 of the derivative output includes the percentage-wise attribution to the initial human creators 102. An additional technique for tracking temporal attribution is described in FIG. 13 and FIG. 14.

Thus, an AI may be trained using content to create a generative AI capable of generating derivative content based on the training content. The user (e.g., derivative content creator) may provide input, in the form of a description describing the desired output, to the generative AI. The generative AI may use the input to generate an output that includes derivative content derived from the training content. When using adjusted attribution, the user may, while viewing the output, repeatedly adjust the influences of particular creators, styles, or the like by specifying the particular creators, styles, or the like and a corresponding weighting. For example, the user may specify "Create an image in the style of creator A", view the output and specify "Make the image 50% in the style of creator A and 50% in the style of creator B" and so on until the user is satisfied with the resulting output. In some cases, the process of the user providing input and the generative AI using the input to adjust the output may happen substantially in real time, e.g., the generative AI may adjust the output less than a few seconds after receiving the user input. An attribution determination module may use the output-based attribution to determine an attribution vector that indicates an amount of attribution for individual creators. For example, the attribution determination module may determine a distance measurement (also referred to as similarity or proximity) between an embedding associated with the output (produced by the generative AI) and (i) creator embeddings of individual creators, (ii) content embeddings of content items, (iii) content item embeddings of characteristics of content items, or (iv) any combination thereof. The distance (e.g., proximity) measurement may be used to determine the creator attribution.

Figure 2:
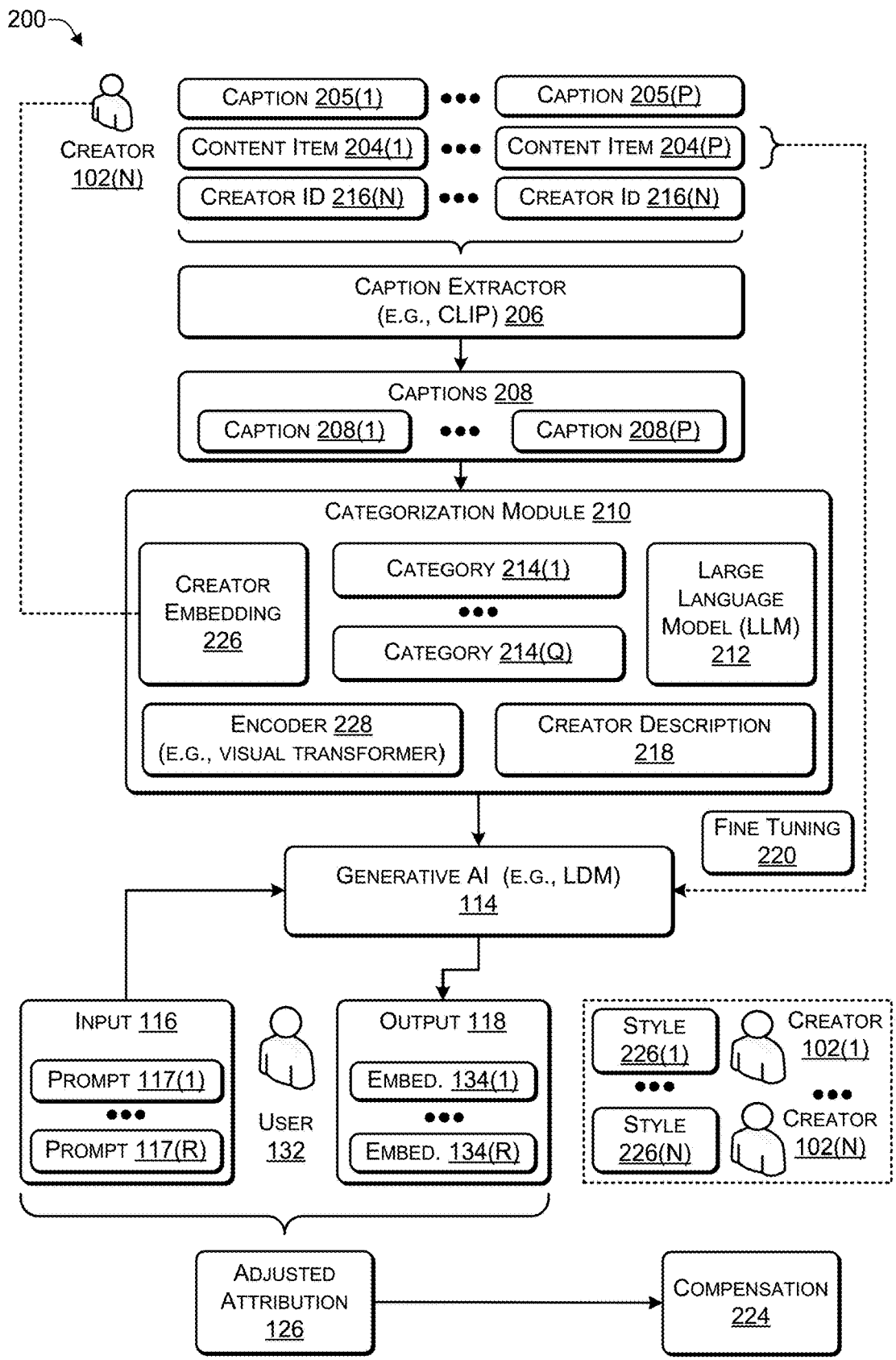
FIG. 2 is a block diagram of a system to train an artificial intelligence (AI) on a particular content creator, according to some embodiments.

FIG. 2 is a block diagram of a system 200 to train an artificial intelligence (AI) on a particular content creator, according to some embodiments. A creator 102(N) (N>0) may create one or more content items 204(1) to 204(P) (P>0) (e.g., a portion of the content items 104 of FIG. 1). The system 200 may be used to train the generative AI 114 to add (e.g., learn) the content items 204 associated with the creator 102(N). The system 200 may be used to train the generative AI 114 to add (learn) a new creator (e.g., content items 204 of the creator 102(N) were not previously used to train the generative AI 114) or add additional content items created by a creator. For example, assume the creator 102(N) creates a first set of content items during a first time period (e.g., Y years, Y>0). The generative AI 114 is trained using the first set of content items to add the creator 102(N). Subsequently, the creator 102(N) creates a second set of content items. The generative AI 114 may be trained using the second set of content items to update the knowledge associated with the creator 102(N).

In some cases, the content items 204 may have associated captions 205 that describe individual content items. For example, caption 205(1) may be a caption that describes the content item 204(1) and caption 205(P) may be a caption that describes the content item 204(P). If one or more of the content items 204 do not have an associated caption 205 or to supplement the caption 205, a caption extractor 206 may be used to create captions 208, where caption 208(1)

describes content item 204(1) and caption 208(P) describes content item 204(P). The caption extractor 206 may be implemented using, for example, a neural network (or another type of AI) such as Contrastive Language Image Pre-training (CLIP), which efficiently learns visual concepts from natural language supervision. CLIP may be applied to visual classification, such as art, images (e.g., photos), video, or the like. The captions 208 produced by the caption extractor 206 may be text-based. In some cases, such as with audio, text, or both, the caption extractor 206 may be implemented using a neural network (or another type of AI), such as Contrastive Language-Audio Pretraining (CLAP) or similar.

A unique identifier (id) 216 may be assigned to each content item 204 associated with individual creators. A unique id 216(N) may be associated with each of the content items 204 associated with the creator 102(N). For example, the unique id 216(N) may be associated with each of the content items 204 using Dreambooth (a deep learning generative model used to fine-tune text-to-image models). The caption extractor 206 may be used to create a caption 208 for each content item 204 if one or more if the content items 204 do not have an associated caption 205 or to supplement the caption 205.

The categorization module 210 is used to identify categories 214(1) to 214(Q) based on the captions 205, 208 associated with each content item. For example, a visual image of a dog and a cat on a sofa may result in the captions "dog", "cat", "sofa". The categorization module 210 may use a large language model 212 to categorize the captions 208. For example, dog and cat may be placed in an animal category 214 and sofa may be placed in a furniture category 214. In this way, the categorization module 210 may create a creator description 218 associated with the unique identifier 216. The creator description 218 may describe the type of content items 204 produced by the creator 202. For example, the categorization module 210 may determine that the creator 202 creates images (e.g., photos or artwork) that include animals and furniture and indicate this information in the creator description 218.

For example, the creator embedding 226 may be viewed as an embedding point $E_{Ai}$ that represents the content items 204 created by artist $A_i$ (e.g., creator 102(N)) and what the generative AP 114 learns from the captions 208. The creator embedding 226 is created using an encoder 228 using an encoding technique, such as a visual transformers, denoted ViT. The generative AI 114 (e.g., $SD_{TUNED}$) may generate output 118 (e.g., an image $I_p$) based on prompt 117 (e.g., prompt p) provided by the user 132. To determine the attribution 222, the distance (e.g., distance $d_1$) of the embedding 134 (e.g., embedding $E_{Ip}$ of the image $I_p$) to the creator embedding 226 (e.g., $E_{A1}$).

The generative AI 114 may use the prompts 117 to produce the output 118. The output 118 may be compared with the creator embedding 226, the categories 214 associated with the creator 102(N), the content items 204, or any combination thereof. In some cases, fine tuning 220 may be performed to further improve the output of the generated AI 114 to enable the output 118 to closely resemble one or more of the content items 204. An attribution module 222, such as the input-based attribution 120, the model-based attribution 122, the output-based attribution 124, the adjusted attribution 126 or any combination thereof, may be used to determine the attribution and provide compensation 224 to the creator 202. A style 226 may be associated with each creator 102 to enable the user 132 to In addition to enabling the user 132 to adjust the influence of particular ones of the creators 102, the adjusted attribution 126 enables the user 132 to adjust the influence based on categories 214 or styles 226 that the user 132 specifies in the input 116 (e.g., the prompts 117(1) to 117(R)). For example, the style 226 of the output 118 may be adjusted to be more similar to creator 102(A) (1<=A<=N), and the subject in the output 118 may be adjusted to be more similar to creator 102(B) (1<=B<=N, B different than A). In some cases, the user 132 may specify a particular iteration during the diffusion process to increase the similarity to a particular one of the creators 102. For example, a first set of iterations may be used to define the content, while a subsequent set of iterations may adjust the style 226, a texture (e.g., brush stroke appearance in a painting), or other characteristic of the output 118. To illustrate, the influence of a particular creator 102 on a particular category may be adjusted when a unique identifier associated with the creator is to be used during the generative process by the generative AI 114. For example, the prompt 117(1) that includes "A dog in the style of artist A1 and in the style of artist A2" does not specify what particular characteristics of artist A1 and of artist A2 are to be used to generate the output 118. However, the user may refine the prompt 117(1) (or provide a subsequent prompt) by specifying "A dog in the style of artist A1 and in a medium similar to artist A2". In the refined prompt, "in the style of artist A1" may be used earlier (e.g., steps 0 to 10) in the diffusion process while "in a medium similar to artist A2" may be used later (e.g. steps 40 to 50) in the diffusion process. By default, the order in which particular ones of the creators 102 are specified in the prompt 117 may determine when in the diffusion process they are used. Of course, the user 132 may override the default order by specifying a particular order in the prompt 117 or by providing multiple prompts 117(1) to 117(R), e.g., a first prompt that includes "A dog in the style of artist A1" followed by a second prompt that includes "Modify the output to be in a medium similar to artist A2".

Thus, an AI may be trained on a particular creator by taking content items created by the particular creator, analyzing the content items to extract captions, and using a categorization module to categorize the captions into multiple categories, using a large language model. The particular creator may be assigned a unique creator identifier and the unique creator identifier may be associated with individual content items associated with the particular creator. The output of the generative AI may be fine-tuned to enable the generative AI to produce output that more closely resembles (e.g., has a greater proximity to) the content items produced by the particular creator.

Figure 3:
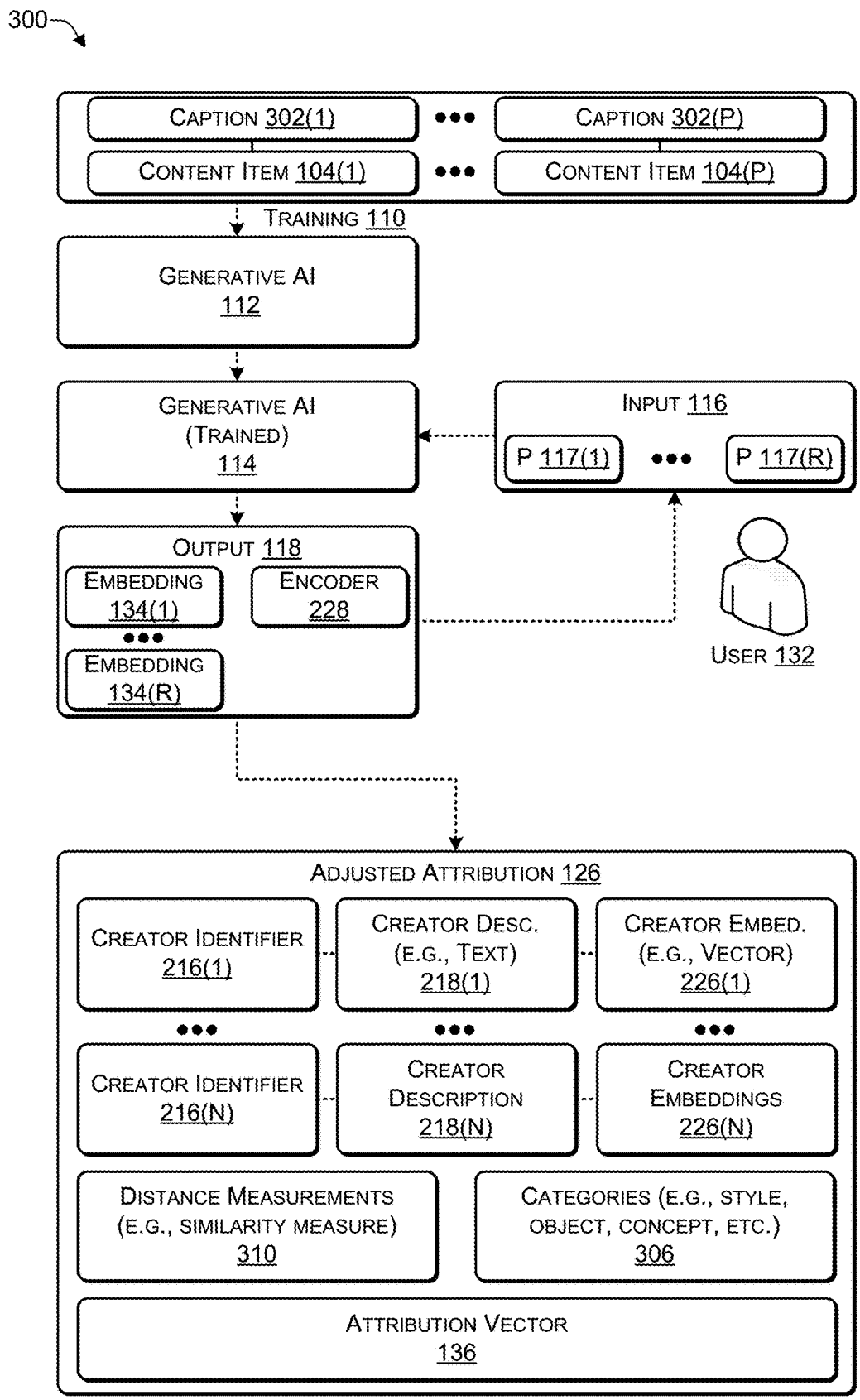
FIG. 3 is a block diagram of a system to create an attribution vector, according to some embodiments.

FIG. 3 is a block diagram of a system 300 to create an attribution vector, according to some embodiments. The output-based attribution 124 may create the attribution vector 136 based on the output 118 (e.g., derivative content) that was generated in response to the user 132 providing the input 116. The attribution vector 136 specifies an amount (e.g., a percentage or another type of measurement) of influence each content item, creator, content item pool, category, style, and the like has on the output 118. Adjusted attribution 126 may be performed using any combination of the techniques described herein.

Each content item 104 may have an associated caption 302. For example, content item 104(1) may have an associated caption 302(1) and content item 104(P) may have an associated caption 302(P). Each caption 302 may include (i) the caption 205 (e.g., description) provided by the creator 102 that created the content item 104, (ii) the caption 208 created by the caption extractor 206 of FIG. 2, or both.

The Adjusted attribution 126 determines the attribution vector 136 for the output 118. The attribution vector 136 specifies a percentage of influence that each image, creator, pool, category, or the like had in the creation of the output 118 created by the generative AI 114 based on the input 116 (e.g., the prompts 117(1) to 117(R)).

Each of the creators 102 of FIG. 1 may have an associated creator identifier 216, a text-based creator description 218, and a vector-based (or matrix-based) creator embedding 226. In some cases, the adjusted attribution 126 may determine categories 306 (e.g., characteristics) associated with the training data 108 and analyze the embedding 134 to identify which of the categories 306 are present. The adjusted attribution 126 may determine distance measurements 310 between the embedding 134 and the categories 306, between the embedding 134 and the individual creator embeddings 226, or both.

Adjusted attribution 126 determines the influence of a set of content creators on the output 118 after the user 132 has finished adjusting the influence to create the output 118. For example, the user 132 may select a set of content creators (creators 102 of FIG. 1) and then "mix" (e.g., adjust) substantially in real-time, the influence of individual content creators in the set of content creators, and view the resulting output (substantially in real-time) until the output 118 satisfies the user 132. To illustrate, the user 132 may select a set of creators (e.g., Rembrandt, Degas, Dali, and Vermeer) and adjust, substantially in real-time, an amount of influence of each creator on the resulting output 118 by providing a weight or percentage influence for each creator until the user 132 is satisfied with the output 118. The adjusted attribution 126 may determine individual percentages of influence associated with each of the selected creators, with each percentage ranging from 0% to 100%.

In this way, the output to a generative AI is analyzed to identify categories (e.g., characteristics) included in the output. For example, the categories may be broader than what was identified in the output, such as a category "animal" (rather than cat, dog, or the like in the output), a category "furniture" (rather than sofa, chair, table, or the like in the output), a category "jewelry" (rather than earring, necklace, bracelet, or the like in the output) and so on. Each creator has a corresponding description that includes categories (also referred to as creator categories) associated with the content items created by each creator. For example, a creator who creates a painting of a girl with a necklace may have a description that includes categories such as "jewelry", "girl", "adolescent", "female", or the like. The creator categories may include the type of media used by each creator. For example, for art, the categories may include pencil drawings (color or monochrome), oil painting, watercolor painting, charcoal drawing, mixed media painting, and so on. The output-based attribution compares the categories identified in the output with the categories associated with each creator and determines a distance measurement for each category. The distance measurements are then used to create an attribution vector that identifies an amount of attribution for each creator based on the analysis of the output.

Figure 4:
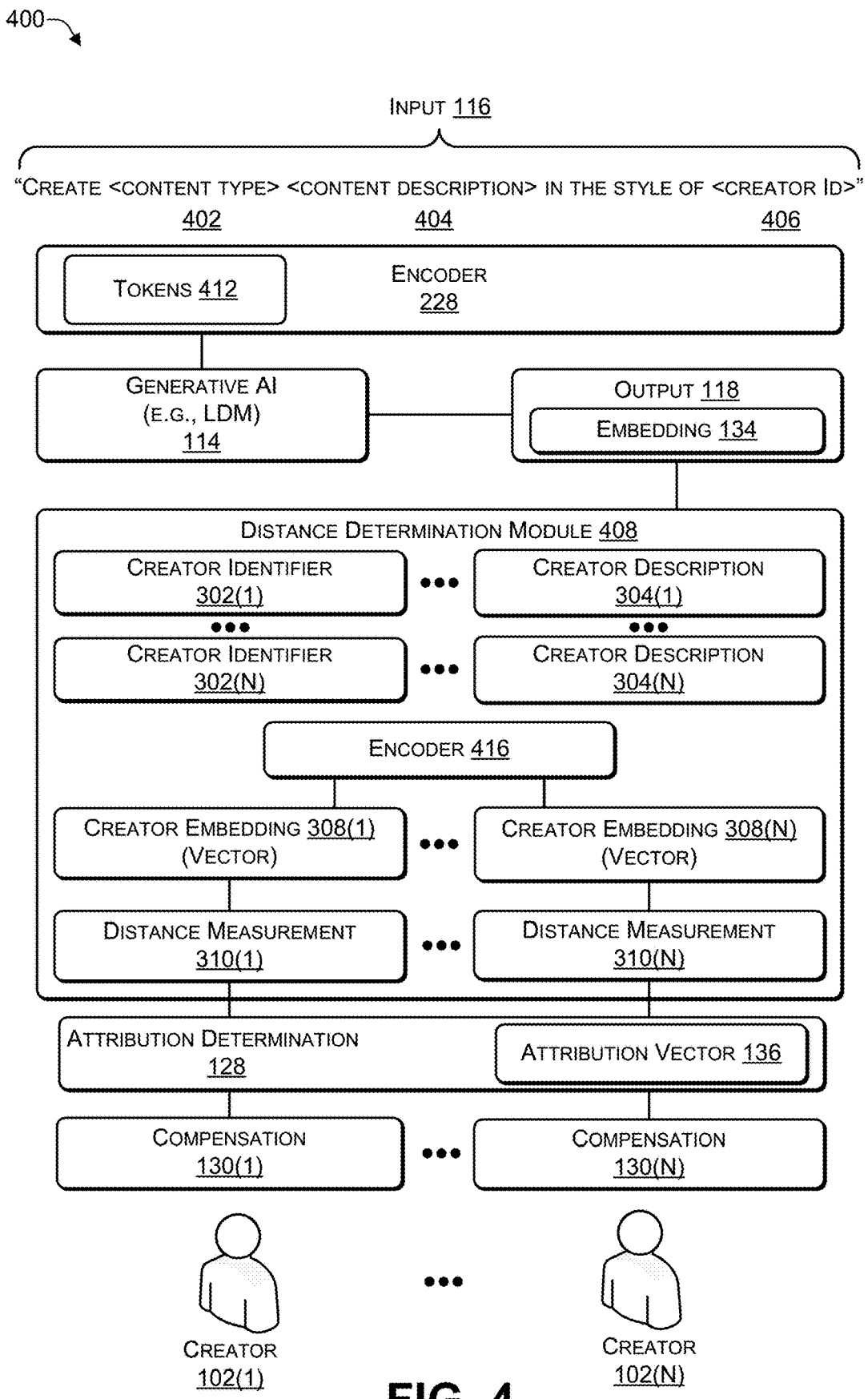
FIG. 4 is a block diagram of a system to perform adjusted attribution based on creator descriptions, according to some embodiments.

FIG. 4 is a block diagram of a system 400 to perform adjusted attribution based on creator embeddings, according to some embodiments. The system 400 describes components of the output-based attribution (module) 124 of FIGS. 1, 2, and 3.

Creator identifiers (e.g., creator names) 302(1) to 302(N) correspond to creators 102(1) to 102(N), respectively. If the system 400 determines that a particular creator 102(X) (0<X<=N) of the creators 102 is identified in the embedding 134, then the particular creator 102(X) may be added to the attribution vector 136. For example, if the embedding 134 includes the creator identifiers "Dali" and "Picasso" then both creators may be added to the attribution vector 136. The system 400 may determine the embedding 134 corresponding to the output 118. A distance determination module 408 may compare the embedding 134 (Et) to creator embeddings 308(1) to 308(N) (e.g., ECi) to determine a distance (e.g., proximity) of the output 118 to individual creators 102. The distance determination module 408 determines a distance (e.g., proximity) using a similarity measure Di, such as a cosine similarity, an Orchini similarity, a Tucker coefficient of congruence, a Jaccard index, a Sorensen similarity index, contrastive learning (e.g., self-supervised learning), or another type of distance or similarity measure, to create distance measurements 310(1) to 310(N) corresponding to the creators 102(1) to 102(N), respectively.

The input 116 may include a prompt, e.g., create content type 402 having content description 404 in the style of creator identifier(s) 406. A caption is text that describes an existing image, whereas a prompt is text that specifies a desired, but currently non-existent image. For example, the text "create a painting of a woman in the style of Picasso and Dali" is a prompt, not a caption. To process the prompt (in the input 116), the text is converted into tokens 412 by an encoder, such as the encoder 228. This may be viewed as one stage in a complex image synthesis pipeline. The tokens 412 are an encoding (e.g., representation) of the text to make the input 116 processable by the generative AI 114. For example, the space between words can be a token, as can be a comma separating words. In a simple case, each word, each punctuation symbol, and each space may be assigned a token. However, a token can also refer to multiple words, or to multiple syllables within a word. There are many words in a language (e.g., English). By grouping the words together to create the tokens 412, the result, as compared to the text in the input 116, is relatively few tokens (e.g., compression) with a relatively high-level meaning. A caption, rather than a prompt, works the other way around. For example, given an image combining the paintings of two artists, an image embedding comprising a vector of numbers (e.g., 512 numbers) of the image may be decoded into the text "a painting of a woman in the style of Dali and Picasso". Converting an image into a vector of numbers and then converting those numbers back into text is referred to as caption extraction.

A creator embedding of Picasso (e.g., 308(P)) and a creator embedding of Dali (e.g., 308(D)) are each vectors of numbers. Each creator embedding 308 may be created as follows. First, images of paintings painted by a creator (e.g., Picasso) are obtained and supplied to encoder 416, with each image having a caption that includes "a painting by Picasso". The encoder 416 turns both the painting and the associated caption into a vector of numbers, e.g., the creator embedding 308(P) associated creator Picasso. During the training phase 101 of FIG. 1, the generative AI 114 (e.g., Stable Diffusion) learns to properly reconstruct an image using a vector of numbers. By causing the generative AI 114 to reconstruct many (e.g., dozens, hundreds, or thousands) of images of Picasso paintings using just the vector of numbers (e.g., 512 numbers) derived from text, the generative AI 114 learns to map the word "Picasso" in the text input to a certain style in the images (e.g., in the output 118)

created by the generative AI 114. After the training phase 101 has been completed, the generative AI 114 knows what is meant when the input 116 includes the text "Picasso". From the training phase 101, the generative AI 114 knows exactly which numbers create the embedding 134 to enable generating any type of image in the style of Picasso. In this way, the creator embedding 308(P) associated with Picasso is a vector of numbers that represent the style of Picasso. A similar training process is performed for each creator, such as Dali.

Thus, each creator has a corresponding description that includes categories (also referred to as creator categories or creator characteristics) associated with the content items created by each creator. For example, a creator who creates a painting of a girl with a necklace may have a description that includes categories (characteristics) such as "jewelry", "girl", "adolescent", "female", or the like. The creator categories may include the type of media used by each creator. For example, for art, the categories may include pencil drawings (color or monochrome), oil painting, watercolor painting, charcoal drawing, mixed media painting, and so on. The distance determination module compares the categories identified in the output with the categories associated with each creator to determine a distance (e.g., similarity) measure for each category. The distance measurements are used to create an attribution vector that identifies an amount of attribution for each creator based on the analysis of the output.

Figure 5:
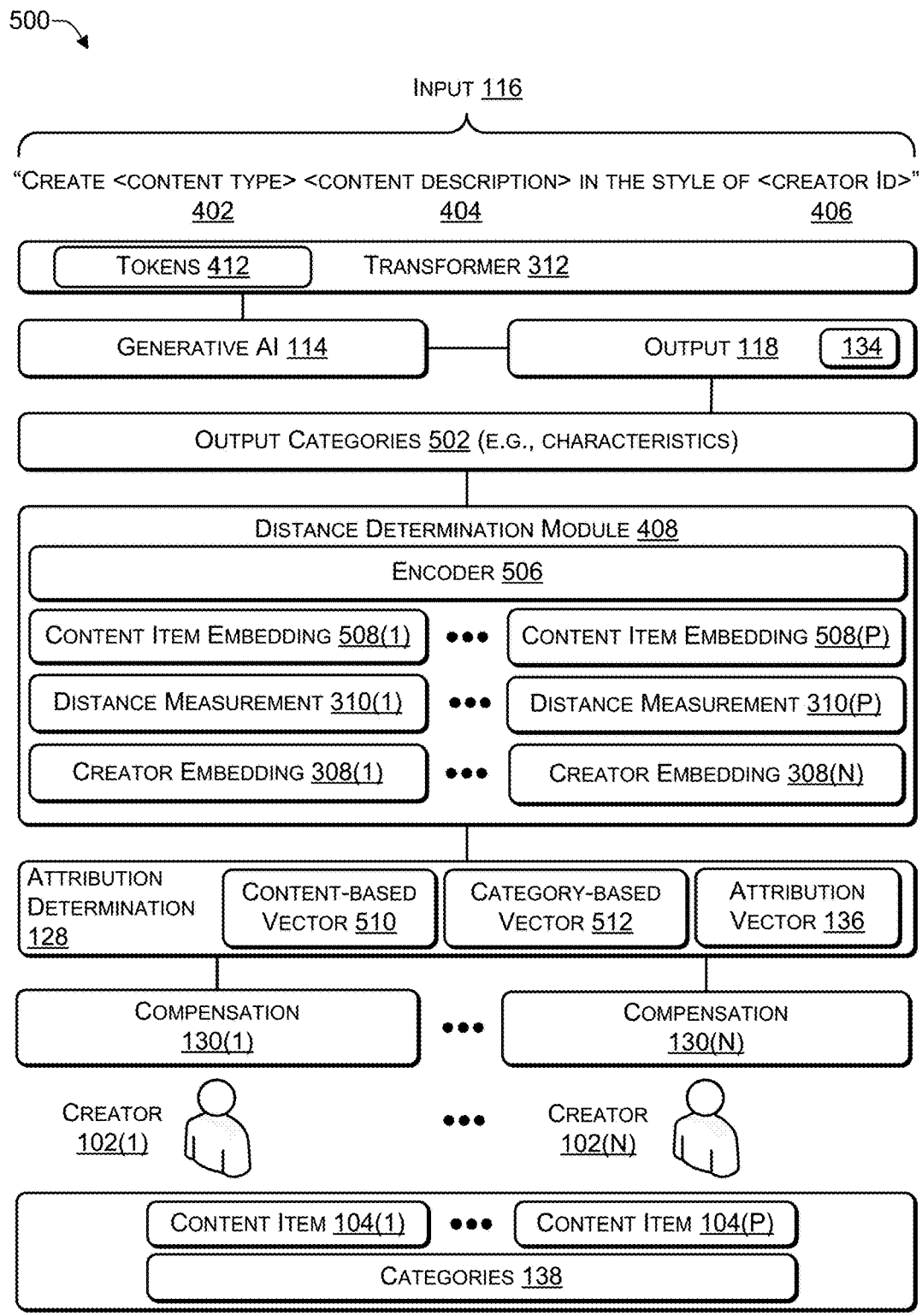
FIG. 5 is a block diagram of a system to perform adjusted attribution, according to some embodiments.

FIG. 5 is a block diagram of a system 500 to perform adjusted attribution, according to some embodiments. The attribution vector 136 may be created based on determining a similarity (i) between content items 104 of FIG. 1 and the output 118, (ii) between categories 502 (e.g., characteristics) of the output 118 and the categories of each of the content items 104, (iii) between creator embeddings and the output 118 (e.g., as described in FIG. 4), or (iv) any combination thereof.

The system 500 may determine the attribution vector 136 based on the influence of each content item 104 in the training data 108 on the output 118. For example, for content items 104 (1) to 104(P), the system 500 may use an encoder 506 (e.g., a visual transformer or similar) to determine a content item embedding 508(1) to 508(P), respectively. The distance determination module 408 may determine a distance (e.g., proximity) between (i) the content item embedding 508 of the output 118 (e.g., image $I_p$) to (ii) each content item embedding 508(1) to 508(P) to create distance measurements 310(1) to 310(P), respectively. The distance measurements 310 may be used to create a content-based attribution vector 510. The system 500 may sum the attribution of the content items 104 of individual content creators 102 to determine the attribution vector 136.

The system 500 may determine the attribution vector 136 based on the influence of output categories 502 (characteristics) of the output 118 with categories included in the content items 104 (in the training data 108). Based on receiving input 116 (e.g., prompt p), the generative AI 114 (e.g., an AI model SD) creates the output 118 (e.g., an image I). The output-based attribution 124 of FIGS. 1, 2, and 3 may be determined for each of the output categories 502. For example, the output 118 may be influenced by (1) the subject (e.g., human portrait) associated with creator 102(1), (2) the artistic medium (e.g., watercolor) associated with creator 102(2), and (3) the mood (e.g., lightning storm) associated with creator 102(3). Using the output categories 502, the system 500 may determine a category-based vector 512. The system 500 may use the category-based vector 512 to create the attribution vector 136, thereby enabling a more fine-grained assessment of artistic attribution as the category-based vector 512 (and attribution vector 136) takes into account various characteristics of the output 118.

The category-based vector 512 may be determined as follows. The content items 104 may be analyzed to identify the categories 138 of FIG. 1 (e.g., characteristics) associated with the training data 108, such as, for example, content (e.g., human portrait, animal portrait, portrait of human with animal, or the like), medium (e.g., oil, watercolor, or the like), style (e.g., renaissance, impressionist, modern, or the like), place (e.g., country, city, ocean, river, lake, or the like), mood (e.g., bright, happy, dark, sad, moody, pain, pleasure, or the like), and the like. The system 500 may create a content item embedding 508 of a text description of each content item 104 in each of the categories 504. For a particular creator 102(N), the system 500 may use either the creator embedding 308(N) or an average of all embeddings of all content 102 associated with the particular creator 102(N) as a proxy for the creator embedding. The system 500 may determine the distance (e.g., proximity) measurements 310 between individual creator embeddings 308 relative all members of each category 504. For the output 118, the system 500 may determine the distance of the embedding 134 to each of the categories 502. The system 500 may compare the two previously determined distances to determine an amount of the influence of each creator 102 on the output 118. For example, when the category-based distances are relatively small (e.g., relatively close proximity), the creator's influence is relatively large and therefore the creator may receive a relatively large amount of attribution in the attribution vector 136. When the category-based distances are relatively large (e.g., relatively far, not very similar), the creator's influence is relatively small and therefore the creator may receive a relatively small (or zero) amount of attribution in the attribution vector 136.

Figure 6:
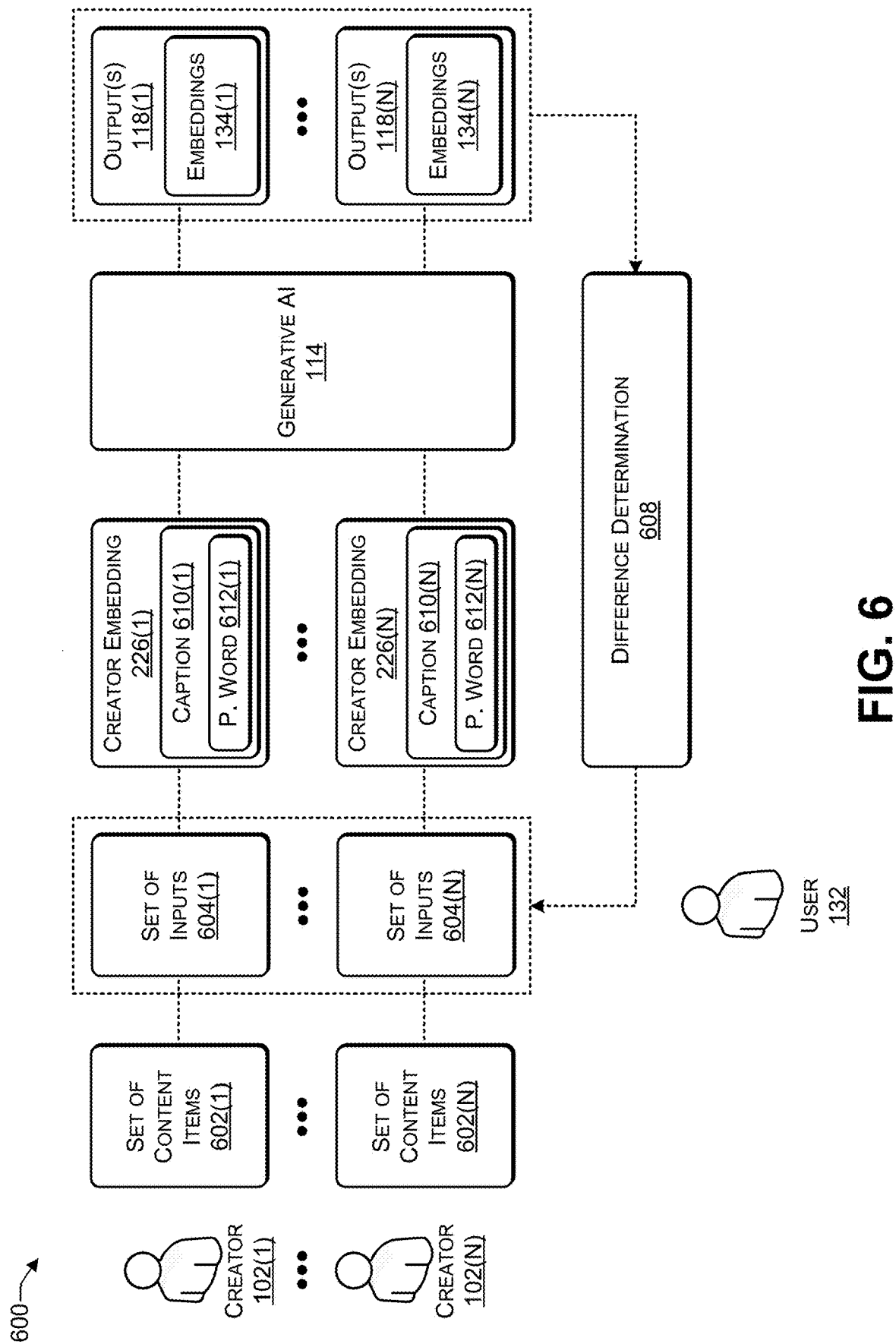
FIG. 6 is a block diagram of a system that includes a difference determination module, according to some embodiments.

FIG. 6 is a block diagram of a system 600 that includes a difference determination module, according to some embodiments. As discussed in FIG. 1, the generative AI 114 may produce output 118 (derivative content) in response to receiving a user prompt 117(1). After viewing the output 118, the user 132 may provide additional prompts 117(2) to (R) (R>0) requesting greater influence of a particular creator 102. One way to achieve this is by transferring a style of the particular creator 102 onto the output 118 and updating the attribution vector 136 based on a weight of a change to the original output 118. Another way to achieve this is as follows. Each creator 102 has an associated set of content items, e.g., the creator 102(1) has an associated set of content items 602(1) and the creator 102(N) has an associated set of content items 602(N). The set of content items are used as a set of inputs 602 to create to create the corresponding creator embeddings 226 of each creator 102 by training ("fine-tuning") the generative AI 114 with the set of content items 602 from each creator 102, where a caption 610 of each creator 102 is extended with a placeholder word 612 for each creator 102. For example, creator 102(1) has the caption 610(1) with the placeholder word 612(1) and creator 102(N) has the caption 610(N) with the placeholder word 612(N). During the training phase 101 of FIG. 1, the generative AI 114 learns the specific style of each creator 102 that may not have been captured by the associated caption 610. The specific style of each creator 102 may be condensed into a single point ECi in embedding space. After the training phase 101 is complete, the generative AI 114 may generate the output 118 (derivative content) based on the initial user input 116 (prompt 117(1)). The initial output 118 may have an initial image embedding 134(1). When the user 132 provides additional prompts 117 to increase the influence of a particular creator 102, the system 600 adds the respective point in embedding space (ECi) to the initial image embedding 134 of the output 118 weighted by a specified (or default) amount. For example, the user 132 may specify in the additional prompt 117 to "increase the influence of creator X by Y %", in which case the weight is determined based on Y %. If the user does not specify Y, then the systems and techniques may use a default amount (e.g., 1%, 2%, 5%, 10%, or the like). Based on the additional prompt 117, the generative AI 114 creates new content based on the new embedding which combines the embedding of the initially generated output and the added embeddings of one or more specified creators 102.

A difference determination module 608 may compare the generated outputs 118(1) to 118(N) to the corresponding set of inputs (data points) 604(1) to 604(N), respectively, until the generative AI 114 has learned to generate the outputs 118 in the style of the associated content creators 102 from having learnt creator embeddings 226(1) to 226(N). When the user 132 desires to increase the influence of a particular creator 102, the respective point in embedding space for the particular creator 102 may be added to a current embedding 134 of the output 118 weighted by a user specified percentage. An updated output 118 is generated from the new embedding which combines the embedding 134 of the initially generated image and the added creator embeddings (226 of FIG. 2 or 308 of FIG. 3) of one or more desired creators. If desired, the overall layout of the initially generated output may be kept by starting the diffusion process with that output instead of starting with noise.

In the flow diagram of FIGS. 7, 8, 9, 10, and 11 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 700, 800, 900, 1000, and 1100 are described with reference to FIGS. 1, 2, 3, 4, 5, and 6 as described above, although other models, frameworks, systems and environments may be used to implement these processes.

Figure 7:
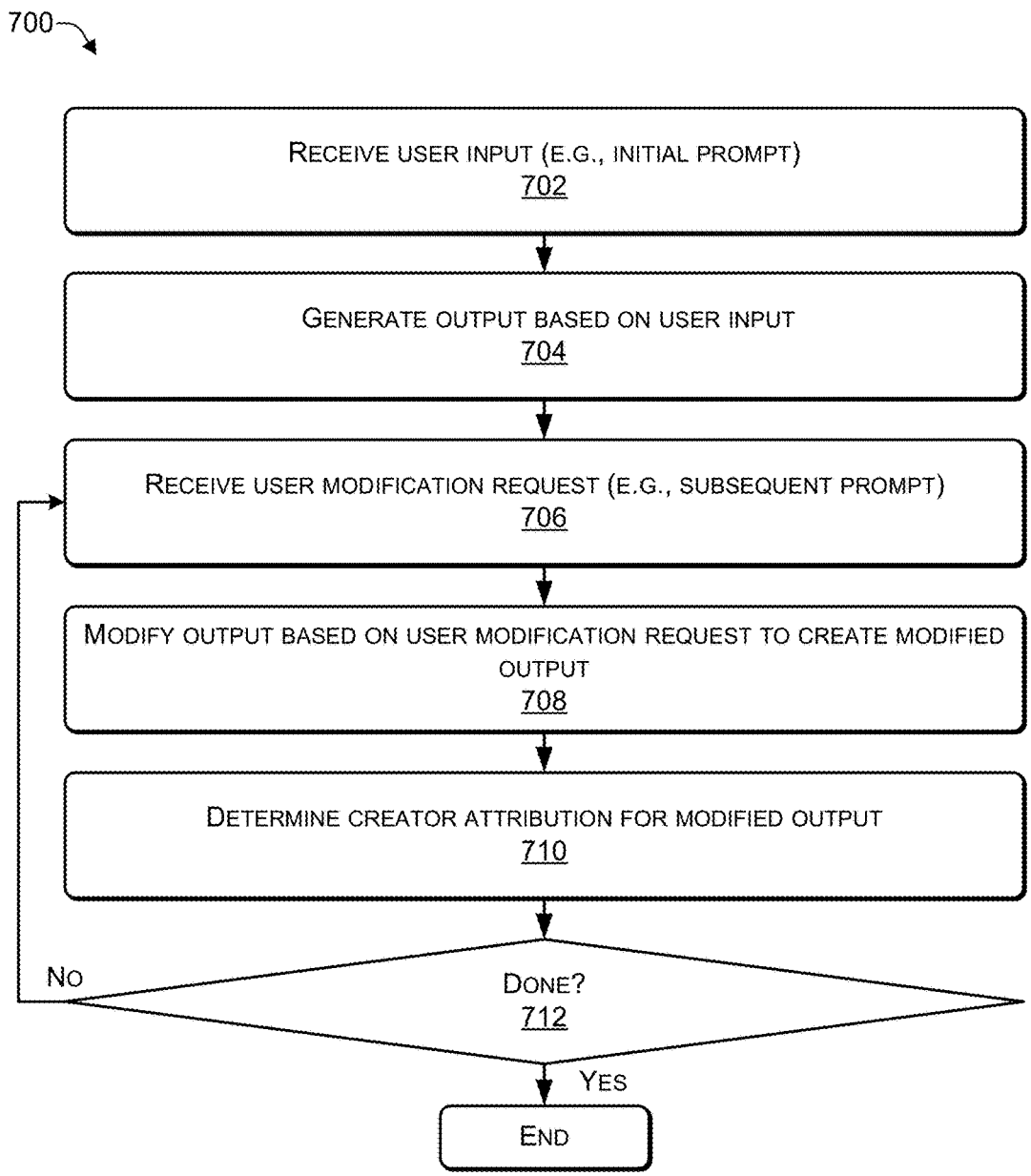
FIG. 7 is a flowchart of a process that includes determining creator attribution for a modified output, according to some embodiments.

FIG. 7 is a flowchart of a process 700 that includes determining creator attribution for a modified output, according to some embodiments. The process 700 may be performed by the generative AI 114, the adjusted attribution 126 of FIGS. 1, 2, and 3, the attribution determination module 128 of FIGS. 1, 4, and 5, or any combination thereof.

At 702, the process may receive user input, such as an initial prompt. At 704, the process may generate output based on the user input. At 706, the process may receive a user modification request, such as a subsequent prompt. At 708, the process may modify the output based on the user modification request to create modified output. At 710, the process may determine creator attribution for the modified output. At 712, the process may determine whether the user is satisfied with the modified output. If the process determines, at 712, that yes the user is satisfied with the modified output, then the process may end. If the process determines, at 712, that no the user is dissatisfied with the modified output, then the process may proceed back to 706 to receive an additional user modification request. In this way, 706, 708, 710, and 712 may be repeated, e.g., additional user input may be received and used to modify the output, until the user is satisfied with the modified output. For example, in FIG. 1, the user 132 may provide the initial prompt 117(1), causing the generative AI 114 to produce the output 118 that includes an initial embedding 134(1). The user 132 may provide a user modification request, such as a subsequent prompt 117, causing the generative AI 114 to produce modified output 118 including an embedding 134 of the modified output. The user modification request may include information about how much, such as percentage of a particular creator, to include or exclude from the output 118. The user 132 may continue to provide the prompts 117 until the user 132 is satisfied with the resulting output 118.

Thus, in adjusted attribution, the user may repeatedly provide input to guide the output generated by the generative AI until the user is satisfied with the resulting output. For example, the user may provide input to create output (derivative content) in the style of a particular creator and then repeatedly modify the output by specifying additional creators and an amount or percentage of the additional creators to add or subtract to the output.

Figure 8:
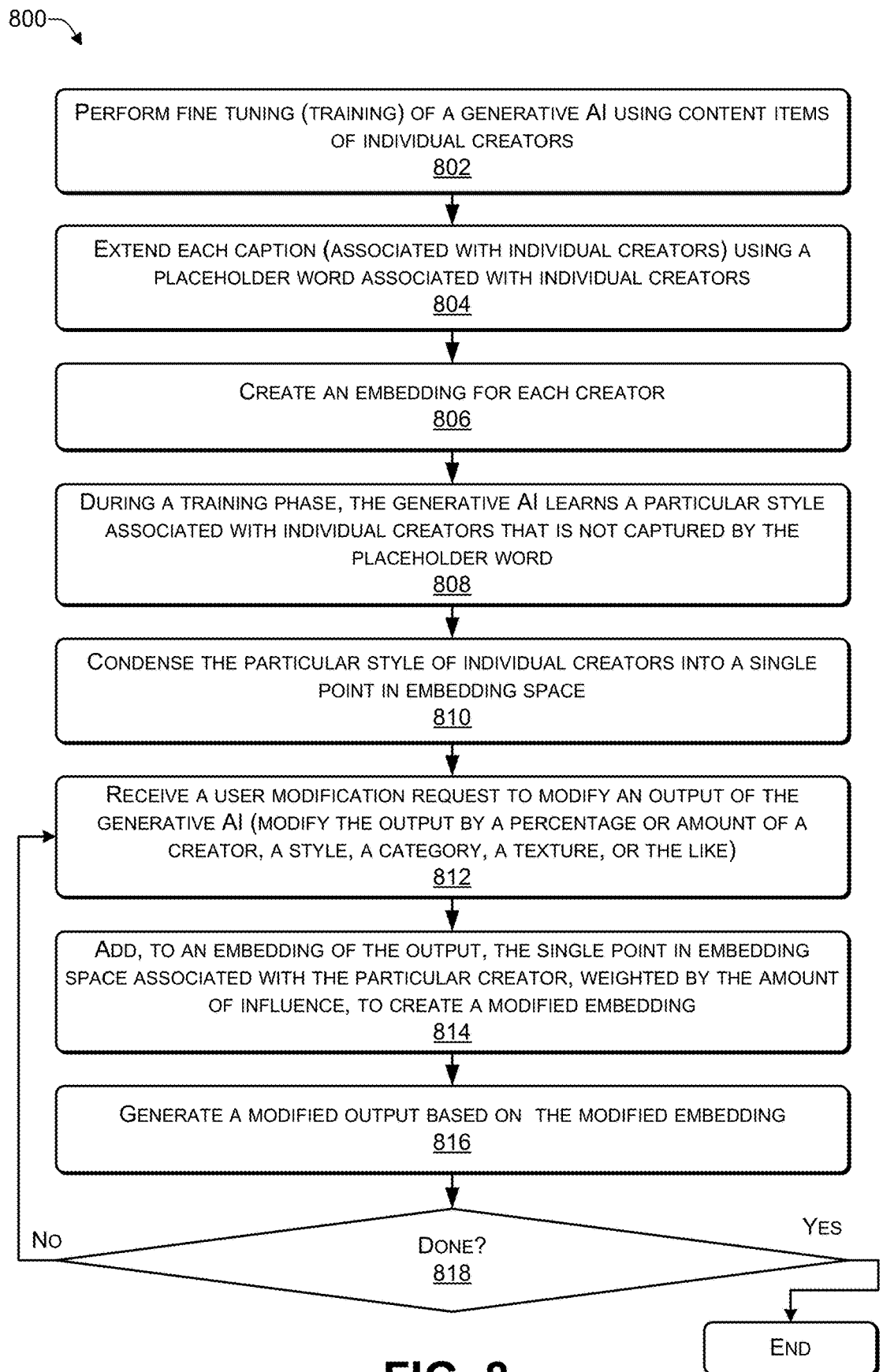
FIG. 8 is a flowchart of a process that includes generating a modified output based on a modified embedding, according to some embodiments.

FIG. 8 is a flowchart of a process 800 that includes generating a modified output based on a modified embedding, according to some embodiments. The process 800 may be performed by the generative AI 114, the adjusted attribution 126 of FIGS. 1, 2, and 3, the attribution determination module 128 of FIGS. 1, 4, and 5, or any combination thereof.

At 802, the process may perform fine tuning (training) of a generative AI using content items of the individual creators. For example, in FIG. 2, the generative AI 114 may undergo the fine tuning 220 based on the content items 204 associated with individual creators 102.

At 804, a caption associated with individual creators may be extended using a placeholder word associated with individual creators. For example, in FIG. 6, the caption 610 associated with individual creators 102 may be extended using a placeholder word 612.

At 806, an embedding may be created for each creator. For example, in FIG. 6, the creator embedding 226 may be created for individual ones of the creators 102.

At 808, during the training phase, the generative AI learns a particular style associated with individual creators that is not captured by the placeholder word. For example, in FIG. 2, each creator 102 may have an associated style 226 that the generative AI 114 learns. The associated style 226 may not be fully captured by the placeholder word 612 of FIG. 6.

At 810, the particular style of individual creators may be condensed into a single point in embedding space. At 812, the process may receive a user modification request to modify an output of the generative AI. The user modification request may include a request to modify the output by a percentage or an amount of a creator, a category, a texture, or the like. At 814, the process may add, to an embedding of the output, the single point in embedding space associated with the particular creator, weighted by an amount of influence, to create a modified embedding. At 816, the process may generate a modified output based on the modified embedding. At 818, the process may determine whether the user is done modifying the output (e.g., whether the user is satisfied with the modified output). If the process determines, at 818, that "yes" the user is done modifying the output, then the process ends. If the process determines, at 818, that "no" the user is not done modifying the output (e.g., the user wants to further modify the output), then the process may proceed to 812 to receive a next user modification request to modify the output. In this way, 812, 814, 816, and 818 may be repeated until the user is satisfied with the modified output. For example, in FIG. 2, the style 226 of individual creators 102 may be condensed into a single point in embedding space, e.g., the creator embedding 226. The generative AI 114 may receive a user modification request (one of the prompts 117) to modify the output 118 of the generative AI 114. The prompts 117 may include a request to modify the output 118 by a percentage or an amount of a creator, a category, a texture, or the like. The generative AI 114 may add, to the embedding 134 of the output 118, the single point in embedding space 226 associated with the particular creator 102, weighted by an amount of influence, to create a modified embedding 134. The generative AI 114 may generate a modified output 118 based on the modified embedding 134. The user 132 may repeatedly provide the prompts 117 to modify the output 118 until the user 132 is satisfied with the modified output 118.

Figure 9:
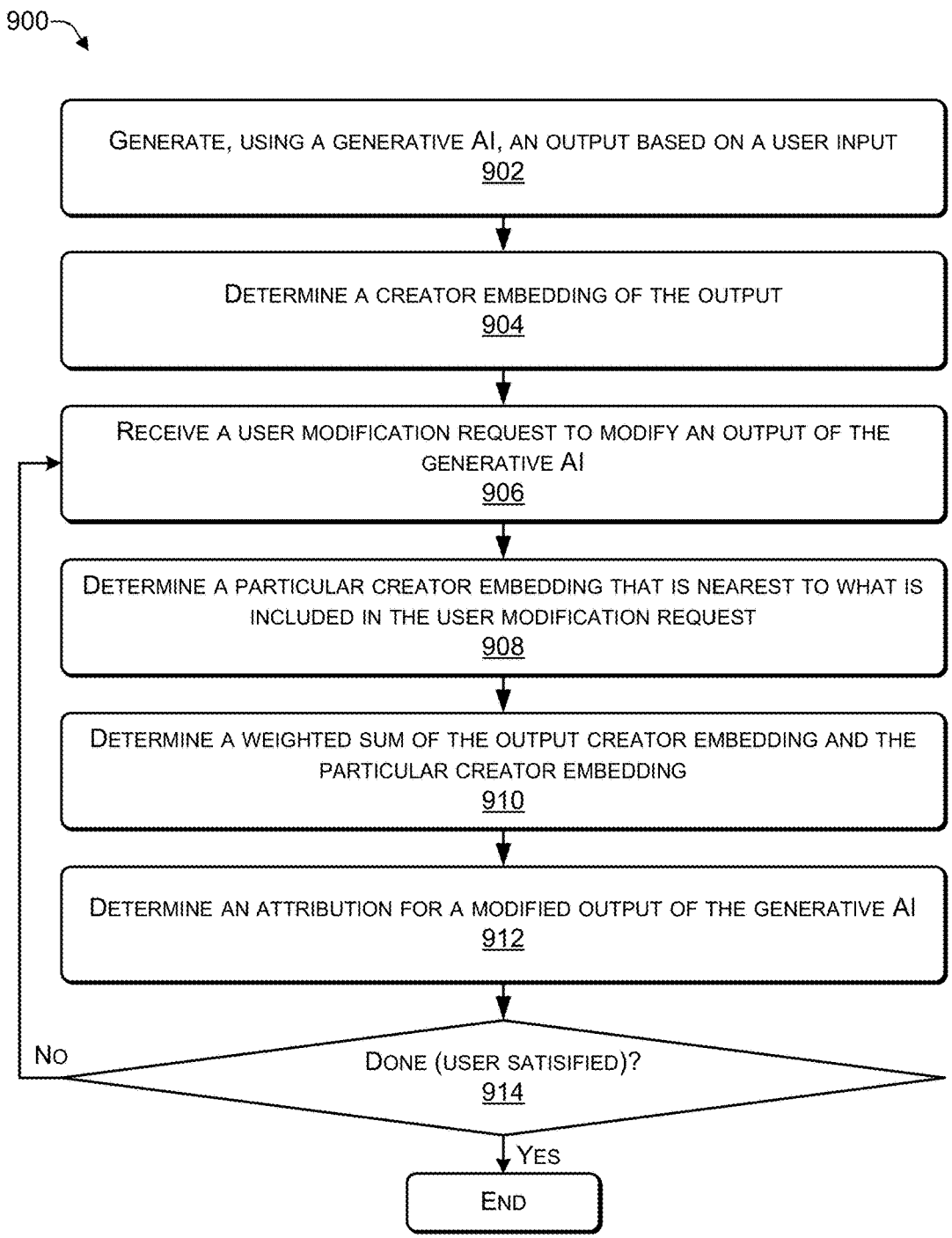
FIG. 9 is a flowchart of a process that includes determining a weighted sum of a creator embedding and a particular creator embedding, according to some embodiments.

FIG. 9 is a flowchart of a process 900 that includes determining a weighted sum of a creator embedding and a particular creator embedding, according to some embodiments. The process 900 may be performed by the generative AI 114, the adjusted attribution 126 of FIGS. 1, 2, and 3, the attribution determination module 128 of FIGS. 1, 4, and 5, or any combination thereof.

At 902, the process may generate, using a generative AI, an output based on a user input. At 904, the process may determine a creator embedding of the output. At 906, the process may receive a user modification request (prompt) to modify an output of the generative AI. At 908, the process may determine a particular creator embedding that is nearest to what is in the user modification request. At 910, the process may determine a weighted sum of (i) the creator embedding and (ii) the particular creator embedding. At 912, the process may determine an attribution for a modified output of the generative AI. At 914, the process may determine whether the process is done (e.g., whether the user is satisfied with the modified output). If the process determines, at 914, that "no" the process (of receiving modification requests and modifying the output) is not done, then the process may proceed back to 906 to receive a subsequent user modification request. If the process determines, at 914, that the process is done, e.g., the user is satisfied with the modified output, then the process ends. For example, in FIG. 3, the generative AI 114 may generate the output 118 based on the input 116 (e.g., an initial prompt 117(1)). The adjusted attribution 126 may determine the creator embedding 134 of the output 118 (e.g., initially the embedding 134(1)). The generative AI 114 may receive a user modification request (e.g., a subsequent prompt 117(S) 1<S<=R) to modify the output 118. The adjusted attribution 126 may determine the particular creator embedding 226 that is nearest to what is in the user modification request (the subsequent prompt 117 (S)). At 910, the process may determine a weighted sum of (i) the creator embedding and (ii) the particular creator embedding. The adjusted attribution 126 may determine the attribution vector 136 for the modified output 118. The adjusted attribution 126 may determine whether the user 132 is satisfied with the modified output 118. If the adjusted attribution 126 determines, the user 132 is not satisfied, then the adjusted attribution 126 may continue to receive subsequent user modification requests (e.g., subsequent prompts 117) until the user 132 is satisfied with the modified output 118.

Figure 10:
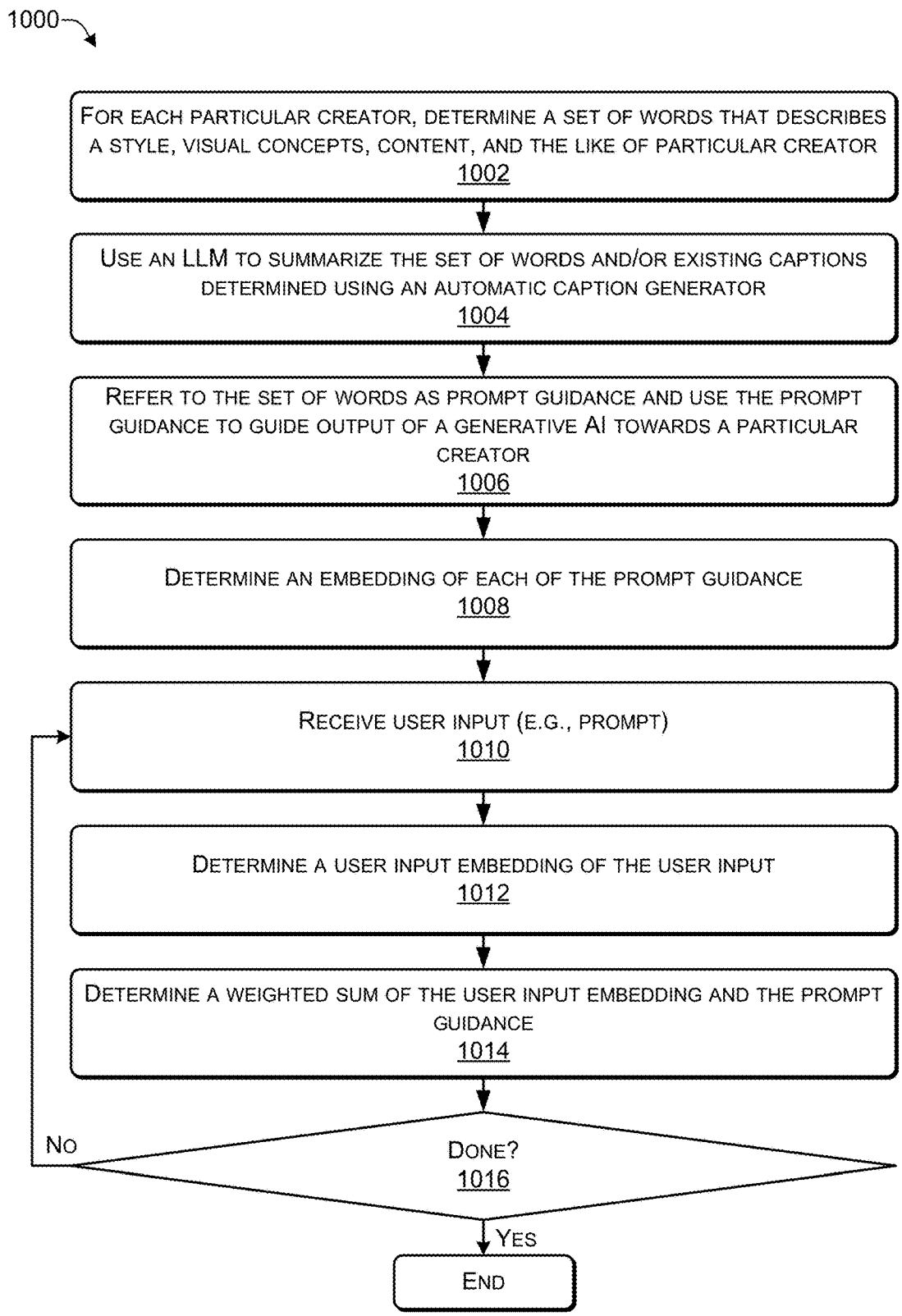
FIG. 10 is a flowchart of a process that includes determining a weighted sum of a a user input embedding and prompt guidance, according to some embodiments.

FIG. 10 is a flowchart of a process 1000 that includes determining a weighted sum of a a user input embedding and prompt guidance, according to some embodiments. The process 1000 may be performed by the generative AI 114, the adjusted attribution 126 of FIGS. 1, 2, and 3, the attribution determination module 128 of FIGS. 1, 4, and 5, or any combination thereof.

At 1002, for each particular creator, the process may determine a set of words that describes a style, visual concepts, content, and the like of the particular creator. At 1004, the process may use an LLM to summarize the set of words, to summarize existing captions determined using an automatic caption generator, or both. At 1006, the process may refer to the set of words as prompt guidance and use the prompt guidance to guide output of a generative AI towards a particular creator. At 1008, the process may determine an embedding of each prompt guidance (set of words). At 1010, the process may receive user input (e.g., a prompt). At 1012, the process may determine a user input embedding of the user input. At 1014, the process may determine a weighted sum of the user input embedding and the prompt guidance. At 1016, the process may determine whether the process is done (the user is satisfied with the output). If the process determines, at 1016, that "no" the user is not satisfied with the output, then the process may proceed back to 1010 to receive additional user input. If the process determines, at 1016, that "yes" the user is satisfied with the output, then the process may end. For example, in FIG. 1, the adjusted attribution 126 may adjust the attribution vector 136 of the output 118 by adjusting the prompt 117(1). For example, for each creator 102, the generative AI 114 determines a set of words (e.g., a sentence) 140 that describes the core style, concepts, content, and other characteristics of each creator 102. For example, the set of words 140(1) may be associated with the creator 102(1) and the set of words 140(N) may be associated with the creator 102(N). The set of words 140 may be created using, for example, automatic caption generation or by using an LLM (e.g., GPT3 or similar) to analyze existing captions. The set of words 140 may include one (or more) sentences that summarize the multiple captions of the content items associated with (e.g., created by) each creator 102. The set of words 140 may be referred to as "prompt guidance" (PG), since set of words 140 may be used to guide a prompt 117 towards a particular creator 102. An embedding E_PG of the prompt guidance may be generated using a text encoder. During generation (inference) of the output 118, the user 132 provides the prompt p, which is used to create an embedding E_P. Based on a desired adjusted attribution factor w (weight) for a particular creator 102, E_PG is added to E_P to obtain E_P'=(1−w)*E_P+w*E_P'

This results in modifying the prompt 117 towards the appropriate embedding space for the current creator 102, by an amount w that the user 132 may specify in the input 116. For example, assume creator A always paints red and white dogs in a cubist style. To guide the generative AI 114 towards the embedding of creator A, the prompt guidance may include "cubist painting of red and white animal". If the user 132 enters the prompt 117 "painting of a cat" and selects creator A as the desired style and specifies a weight of 0.6, the generative AI 114 may use a mixed embedding that consists of 40% "painting of a cat in the style of A" and of 60% "cubist painting of red and white animal". This way, the prompt 117 is guided towards the appropriate embedding area, while the style of A is still used, so that the user 132 receives a cat painting in the red and white cubism style of creator A.

Figure 11:
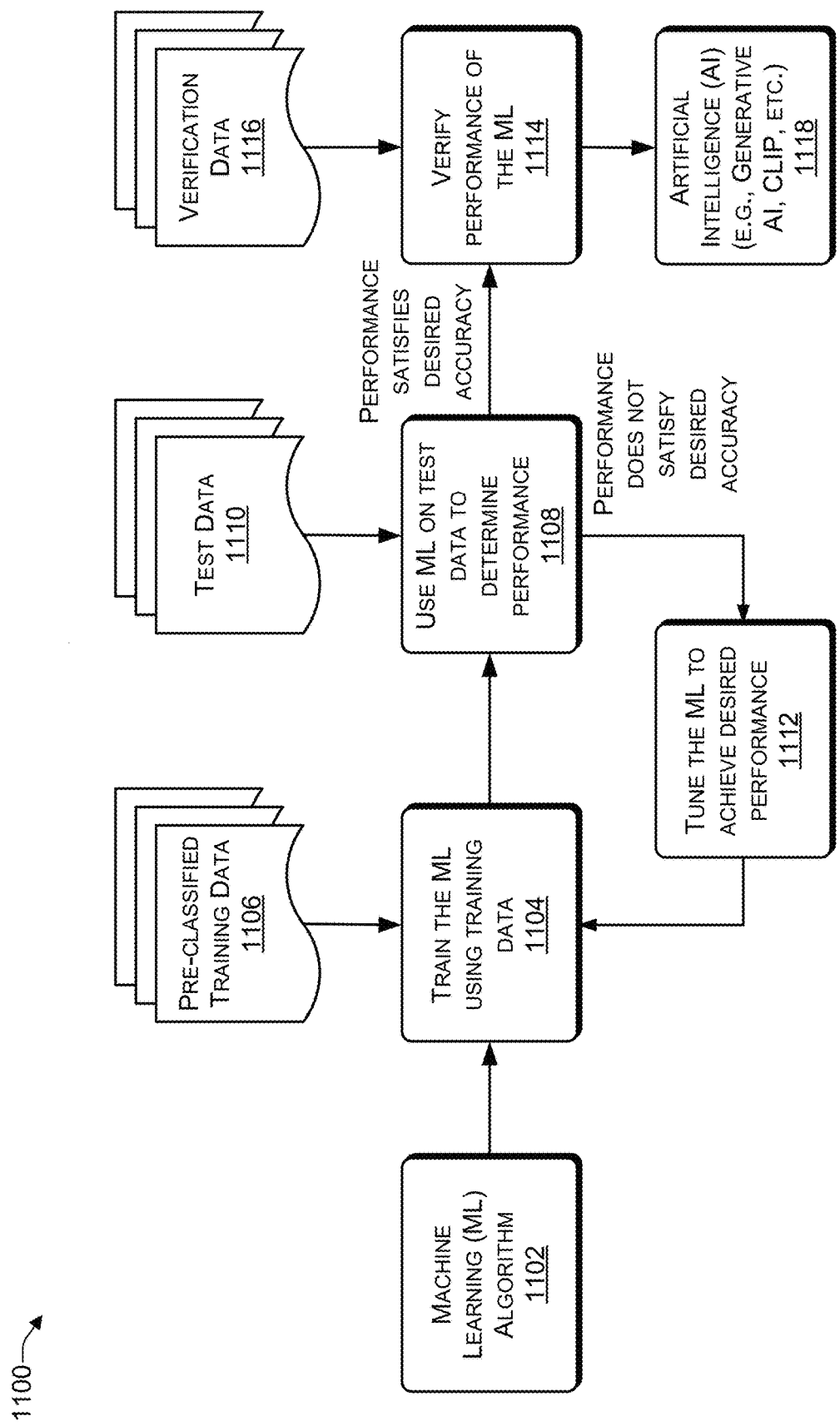
FIG. 11 is a flowchart of a process to train a machine learning algorithm, according to some embodiments.

FIG. 11 is a flowchart of a process 1100 to train a machine learning algorithm, according to some embodiments. For example, the process 1100 may be performed during the training phase 101 of FIG. 1.

At 1102, a machine learning algorithm (e.g., software code) may be created by one or more software designers. For example, the machine learning algorithm may be created by software designers. At 1104, the machine learning algorithm may be trained (e.g., fine-tuned) using pre-classified training data 1106. For example, the training data 1106 may have been pre-classified by humans, by machine learning, or a combination of both. After the machine learning algorithm has been trained using the pre-classified training data 1106, the machine learning may be tested, at 1108, using test data 1110 to determine a performance metric of the machine learning. The performance metric may include, for example, precision, recall, Frechet Inception Distance (FID), or a more complex performance metric. For example, in the case of a classifier, the accuracy of the classification may be determined using the test data 1110.

If the performance metric of the machine learning does not satisfy a desired measurement (e.g., 95%, 98%, 99% in the case of accuracy), at 1108, then the machine learning code may be tuned, at 1112, to achieve the desired performance measurement. For example, at 1112, the software designers may modify the machine learning software code to improve the performance of the machine learning algorithm. After the machine learning has been tuned, at 1112, the machine learning may be retrained, at 1104, using the pre-classified training data 1106. In this way, 1104, 1108, 1112 may be repeated until the performance of the machine learning is able to satisfy the desired performance metric. For example, in the case of a classifier, the classifier may be tuned to classify the test data 1110 with the desired accuracy.

After determining, at 1108, that the performance of the machine learning satisfies the desired performance metric, the process may proceed to 1114, where verification data 1116 may be used to verify the performance of the machine learning. After the performance of the machine learning is verified, at 1114, the machine learning 1102, which has been trained to provide a particular level of performance may be used as an artificial intelligence (AI) 1118. For example, the AI 1118 may be the (trained) generative AI 114, the caption extractor 206 (CLIP neural network) of FIG. 2, or any other type of AI described herein.

Figure 12:
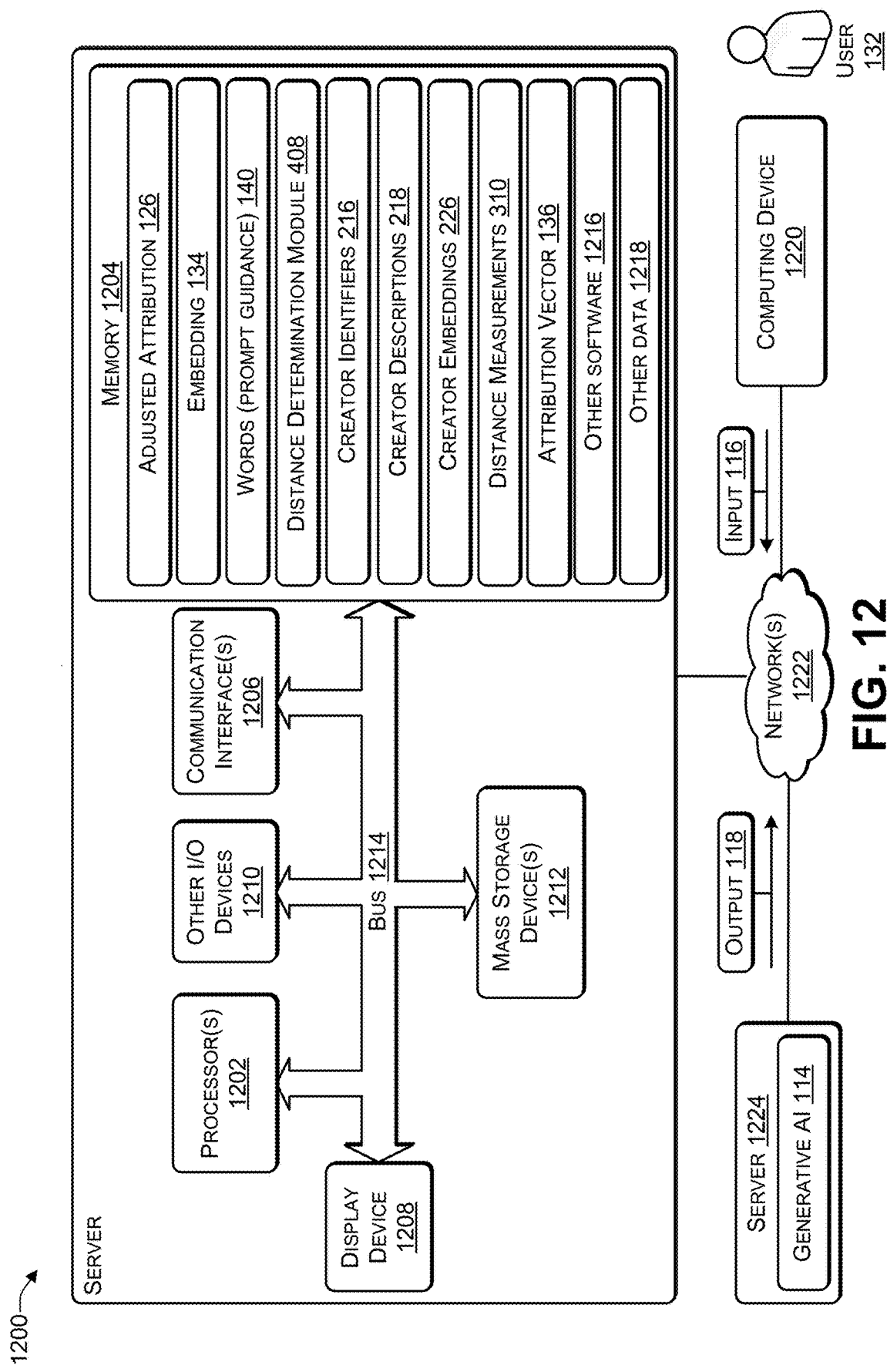
FIG. 12 illustrates an example configuration of a computing device that can be used to implement the systems and techniques described herein.

FIG. 12 illustrates an example configuration of a device 1200 that can be used to implement the systems and techniques described herein. For example, the device 1200 may be a server (or a set of servers) used to host one or more of the components described in FIGS. 1, 2, 3, 4, 5, and 6. In some cases, the systems and techniques described herein may be implemented as an application programming interface (API), a plugin, or another type of implementation.

The device 1200 may include one or more processors 1202 (e.g., central processing unit (CPU), graphics processing unit (GPU), or the like), a memory 1204, communication interfaces 1206, a display device 1208, other input/output (I/O) devices 1210 (e.g., keyboard, trackball, and the like), and one or more mass storage devices 1212 (e.g., disk drive, solid state disk drive, or the like), configured to communicate with each other, such as via one or more system buses 1214 or other suitable connections. While a single system bus 1214 is illustrated for ease of understanding, it should be understood that the system bus 1214 may include multiple buses, such as a memory device bus, a storage device bus (e.g., serial ATA (SATA) and the like), data buses (e.g., universal serial bus (USB) and the like), video signal buses (e.g., ThunderBolt®), digital video interface (DVI), high definition media interface (HDMI), and the like), power buses, etc.

The processors 1202 are one or more hardware devices that may include a single processing unit or a number of processing units, all of which may include single or multiple computing units or multiple cores. The processors 1202 may include a graphics processing unit (GPU) that is integrated into the CPU or the GPU may be a separate processor device from the CPU. The processors 1202 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1202 may be configured to fetch and execute computer-readable instructions stored in the memory 1204, mass storage devices 1212, or other computer-readable media.

Memory 1204 and mass storage devices 1212 are examples of computer storage media (e.g., memory storage devices) for storing instructions that can be executed by the processors 1202 to perform the various functions described herein. For example, memory 1204 may include both volatile memory and non-volatile memory (e.g., random access memory (RAM), read only memory (ROM), or the like) devices. Further, mass storage devices 1212 may include hard disk drives, solid-state drives, removable media, including external and removable drives, memory cards, flash memory, floppy disks, optical disks (e.g., compact disc (CD), digital versatile disc (DVD), a storage array, a network attached storage (NAS), a storage area network (SAN), or the like. Both memory 1204 and mass storage devices 1212 may be collectively referred to as memory or computer storage media herein and may be any type of non-transitory media capable of storing computer-readable, processor-executable program instructions as computer program code that can be executed by the processors 1202 as a particular machine configured for carrying out the operations and functions described in the implementations herein.

The device 1200 may include one or more communication interfaces 1206 for exchanging data via the network 110. The communication interfaces 1206 can facilitate communications within a wide variety of networks and protocol types, including wired networks (e.g., Ethernet, Data Over Cable Service Interface Specification (DOCSIS), digital subscriber line (DSL), Fiber, universal serial bus (USB) etc.) and wireless networks (e.g., wireless local area network (WLAN), global system for mobile (GSM), code division multiple access (CDMA), 802.11, Bluetooth, Wireless USB, ZigBee, cellular, satellite, etc.), the Internet and the like. Communication interfaces 1206 can also provide communication with external storage, such as a storage array, network attached storage, storage area network, cloud storage, or the like.

The display device 1208 may be used for displaying content (e.g., information and images) to users. Other I/O devices 1210 may be devices that receive various inputs from a user and provide various outputs to the user, and may include a keyboard, a touchpad, a mouse, a gaming controller (e.g., joystick, steering controller, accelerator pedal, brake pedal controller, virtual reality (VR) headset, VR glove, or the like), a printer, audio input/output devices, and so forth.

The computer storage media, such as memory 1204 and mass storage devices 1212, may be used to store any of the software and data described herein, as well as other software 1216 and other data 1218.

The user 132 (e.g., secondary creator) may use a computing device 1220 to provide the input 116, via one or more networks 1222, to a server 1224 that hosts the generative AI 114. Based on the input 116, the server 1224 may provide the output 118. The device 1200 may be used to implement the computing device 1220, the server 1224, or another device.

Figure 13:
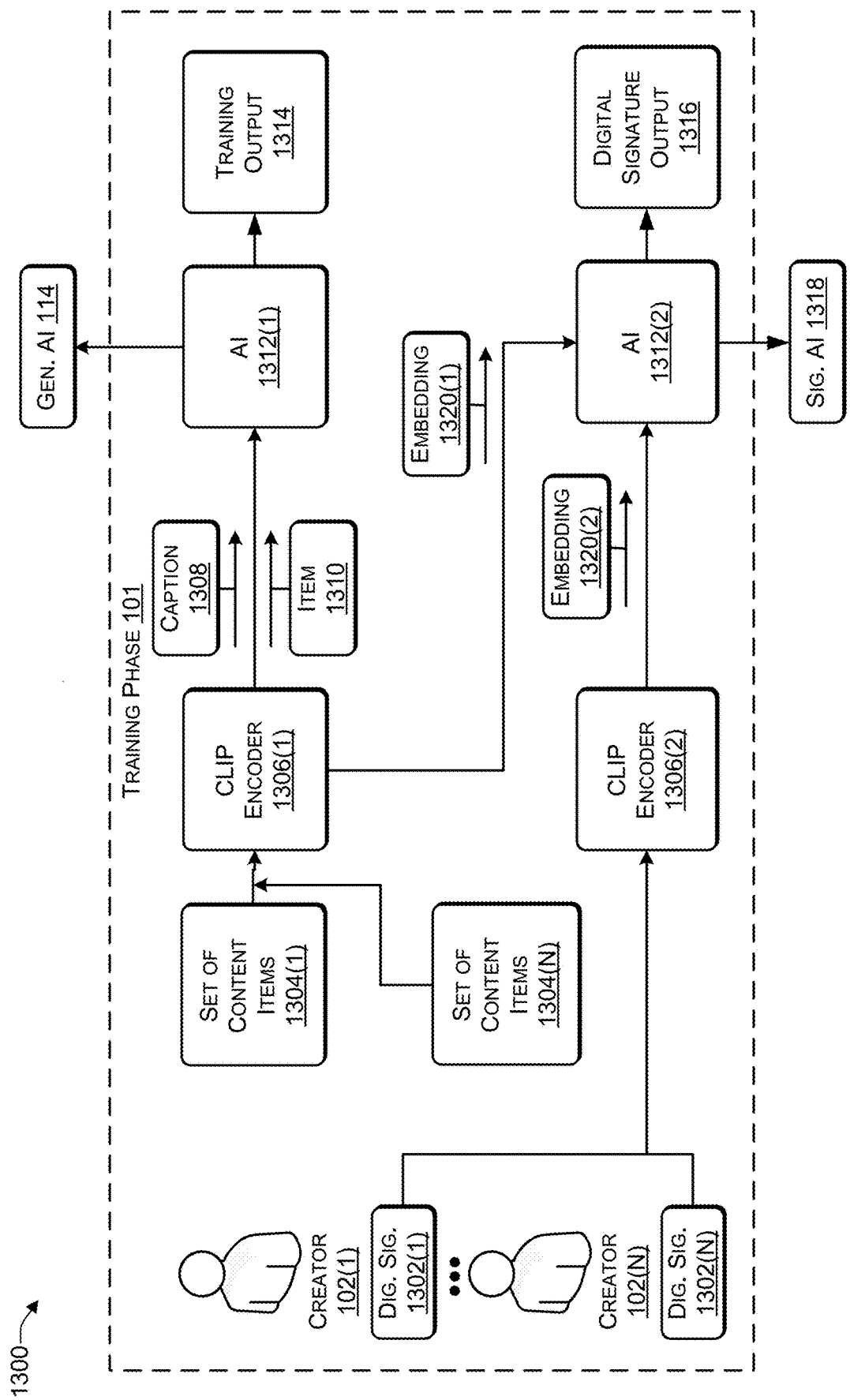
FIG. 13 is a block diagram of a system to train a generative artificial intelligence (AI) and an isotope AI, according to some embodiments.

FIG. 13 is a block diagram of a system 1300 to train a generative artificial intelligence (AI) and an isotope AI, according to some embodiments. Another technique to temporally track attribution is described in FIG. 13 (training phase 101) and FIG. 14 (usage).

In FIG. 13, a set of content items 1304(1) is associated with creator 102(1) and a set of content items 1304(N) is associated with creator 102(N). The set of content items 1304 are part of the content items 104 of FIG. 1. Each set of content items 1304 are processed using a CLIP encoder 1306, which generates a caption 1308 for each item 1310 in the set of content items 1304. During the training phase 101, an AI 1312(1) produces training output 1314. After the training phase 101 has been completed, the AI 1312(1) is placed into operation as the generative AI 114, as described herein.

A digital signature 1302 may be associated with each creator 102. For example, digital signature 1032(1) may be associated with creator 102(1) and digital signature 1302(N) may be associated with creator 102(N). The digital signatures 146 are processed through a CLIP encoder 1306(2) and an AI 1312(2) to create a digital signature output 1316 (similar to how radioactive isotopes are used to track substances in biological processes). The AI 1312(2) works as an autoencoder that includes the CLIP encoder 1306(2) and the AI 1312(2) (decoder).

During the training phase 101, content items 1304 associated with one or more creators 102 are used to train the AI 1312(1). Each of the creators 102 is associated with a digital signature 1302 (that acts as an isotope to uniquely identify the associated creator 102) to indicate attribution to the associated creator 102. For example, the digital signatures 1302 may include a unique image, a unique text string, or a combination of both. During the training phase 101, the CLIP encoder 1306(2) and the AI 1312(2) are effectively a second processing branch that works in parallel with the CLIP encoder 1306(1) and the AI 1312(1), e.g., the set of content items 1304 associated with a particular creator 102 are processed in parallel with the digital signature 1302 of the particular creator 102. The AI 1312(2) uses the same AI algorithm (e.g., same LDM) but modified such that the input layer can process the data structure of the digital signatures 1302.

The output in the training phase 101 is twofold (in parallel). First, the AI 1312(1) generates training output 1314 based on the (caption 1308, item 1310) pair. Second, in parallel with AI 1312(1), the AI 1312(2) generates the digital signature output 1316 based on (1) an embedding 1320(1) output by the clip encoder 1306(1) and (2) an embedding 1320(2) output by the clip encoder 1306(2). For example, the digital signature output 1316 may be created by concatenating or averaging the embedding 1320(1) and 1320(2). After the training phase 101 is completed, the AI 1312(2) may be placed into service as a signature AI 1318. After the training phase 101 is completed, the generative AI 114 produces derivative content and the signature AI is able to reconstruct the unique digital signature 1302 of each creator 102 that influenced the derivative content.

Figure 14:
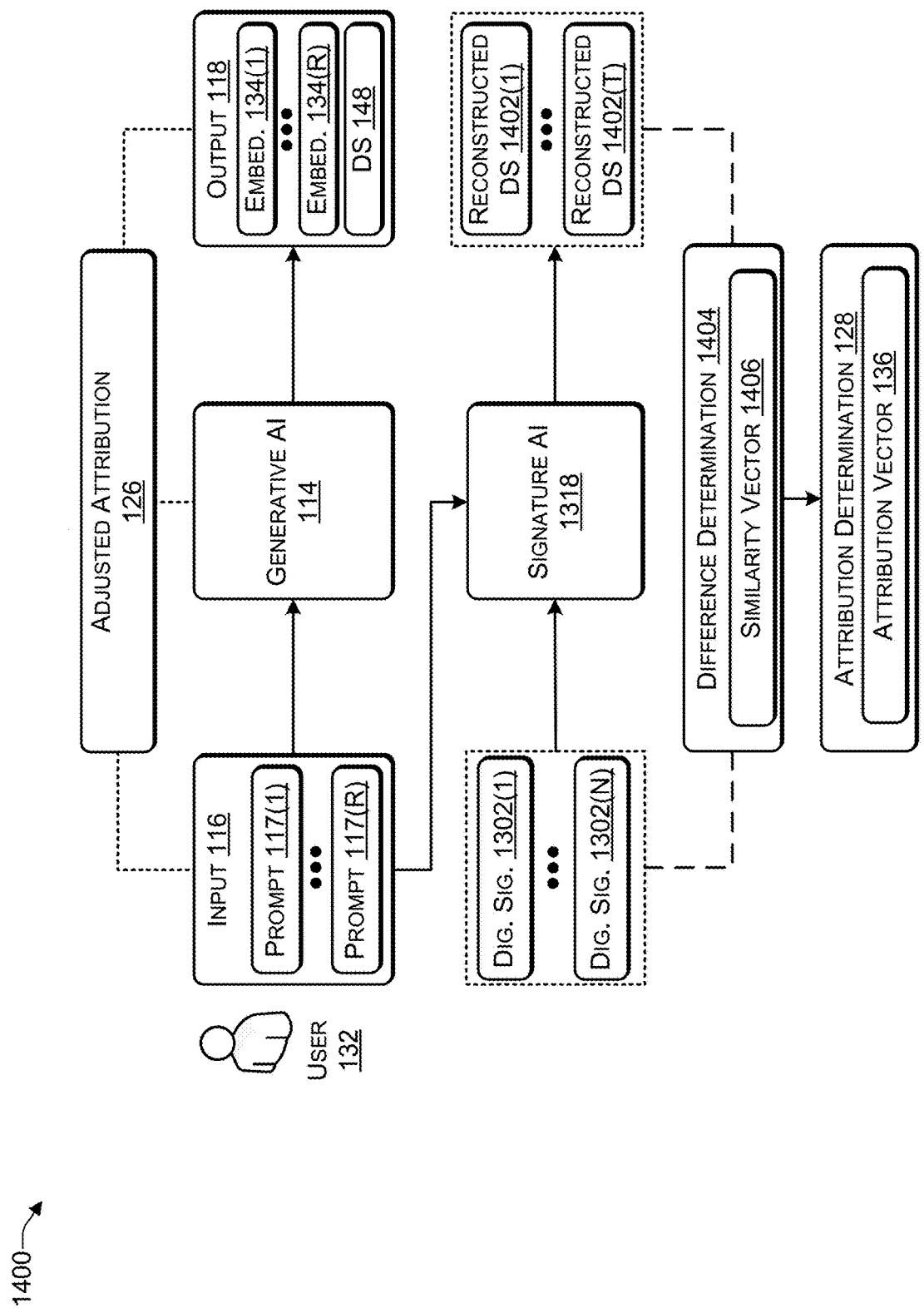
FIG. 14 is a block diagram of a system that includes a generative artificial intelligence (AI) and a signature AI, according to some embodiments.

FIG. 14 is a block diagram of a system 1400 that includes a generative artificial intelligence (AI) and a signature AI, according to some embodiments. When the generative AI 114 generates the output 118, each of the digital signatures 1302 (isotopes) used during the training phase 101 of FIG. 13 are processed using the signature AI 1318 (isotope branch) in parallel with the generative AI 114 processing the prompts 117. The signature AI 1318 reconstructs one or more digital signatures 1402(1) to 1402(T) (T>0). A difference determination module 1404 determines the difference between the reconstructed digital signatures 1402 and the corresponding (original) digital signatures 1302 to determine which set of content items 1304 were used to generate, based on the prompts 117, the output 118.

After receiving the prompt 117, the generative AI 114 generates the output 118. In addition, each of the digital signatures 1302 (isotopes) associated with the creators 102 whose content items were used during the training phase are processed by the signature AI 1318 (second branch) to create the reconstructed digital signatures 1402(1) to 1402(T) (T>0). For example, if the content items associated with 3 creators (e.g., N=3) are used during the training phase 101, then the signature AI 1318 generates three reconstructed digital signatures (e.g., T=3) that are reconstructed using the prompt 117 and the digital signatures 1302(1), 1302(2), 1302(3). The difference determination module 1404 is used to compare the reconstructed digital signatures 1402(1) to 1402(T) to the original digital signatures 1302(1) to 1302(N) (in the above example, T=3) to create a similarity vector 1406 that indicates how similar the output 118 is to the original creators 102(1) to 102(T). The similarity vector 1406 may be used by the attribution determination 128 to create the attribution vector.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining, by one or more processors, that a generative artificial intelligence has generated an initial output based on an initial input provided by a user, the initial input comprising a prompt guidance that identifies:
      a type of content to create;
      a first characteristic associated with the type of content; and
      a first amount of influence specified as a weight of the first;
   determining, by the one or more processors, an initial output embedding describing the initial output, generated by the generative artificial intelligence, in terms of creators, content items, characteristics, or any combination thereof;
   determining, by the one or more processors, that the generative artificial intelligence has generated a subsequent output based on a subsequent input, provided by the user, identifying:
      a second characteristic associated with the type of content, the second characteristic specified in the subsequent input; and
      a second amount of influence specified in the subsequent input as a weight of the second characteristic;
   after receiving the subsequent input, the generative artificial intelligence is configured to:
      create a subsequent creator embedding based at least in part on the subsequent input; and
      generate the subsequent output based at least in part on:
         the subsequent creator embedding; and
         an initial creator embedding created based at least in part on the initial input;
   determining, by the one or more processors, a creator attribution vector that includes one or more creator attributions based at least in part on:
      the initial output embedding;
      identifying one or more of the creators that contributed at least a threshold amount, wherein a particular creator having a contribution less than the threshold amount does not receive a creator attribution;
      the first amount of influence, specified by the user, of the first characteristic, and
      the second amount of influence, specified by the user, of the second characteristic; and
   initiating, by the one or more processors, providing compensation to one or more content creators of a plurality of content creators based on the creator attribution vector.

2. The method of claim 1, wherein, when the type of content comprises a digital image having an appearance of a work of art, at least one of the first characteristic or the second characteristic comprise:
   a name of a particular artist;
   a type of a medium;
   a type of a material applied to the medium;
   an instrument used to apply the material to the medium;
   a style associated with a set of one or more creators; or
   any combination thereof.

3. The method of claim 1, wherein the subsequent output comprises:
   a digital image having an appearance of a work of art;
   a digital visual image;
   a digital music composition;
   a digital video; or
   any combination thereof.

4. The method of claim 1, further comprising:
   performing post-processing on the subsequent output to create a modified output;
   performing a comparison of the subsequent output to the modified output; and
   based at least in part on determining, based on the comparison, that the post-processing has changed the subsequent output by more than a predetermined percentage, modifying the creator attribution vector based on the comparison.

5. The method of claim 1, wherein the generative artificial intelligence generates the subsequent output based on the subsequent input by:
   transferring a particular style of a particular creator identified in the subsequent input by adding a point in embedding space to an initial image embedding of the initial output weighted by a specified amount; and
   updating the creator attribution vector based on the second amount of influence.

6. The method of claim 1, further comprising:
   generating a creator embedding for each creator of the plurality of content creators whose content items are used to train the generative artificial intelligence;
   extending a caption for each creator with a placeholder word associated with each creator; and
   after the generative artificial intelligence has learnt a specific style of each creator that is not captured by the caption, condensing the specific style to a single point creator embedding in an embedding space.

7. The method of claim 6, further comprising:
   determining that the subsequent input identifies a particular creator;
   adding a particular creator embedding associated with the particular creator to a subsequent output embedding associated with the subsequent output with a weight based on the second amount of influence to create a combined embedding; and
   generating the subsequent output based on the combined embedding.

8. A server comprising:
   one or more processors; and
   a non-transitory memory device to store instructions executable by the one or more processors to perform operations comprising:
      determining that a generative artificial intelligence has generated an initial output based on an initial input provided by a user, the initial input comprising a prompt guidance identifying:
         a type of content to create;
         a first characteristic associated with the type of content; and
         a first amount of influence specified as a weight of the first characteristic;
      determining an initial output embedding describing the initial output, generated by the generative artificial intelligence, in terms of creators, content items, characteristics, or any combination thereof;

determining that the generative artificial intelligence has generated a subsequent output based on a subsequent input, provided by the user, identifying:
- a second characteristic associated with the type of content, the second characteristic specified in the subsequent input; and
- a second amount of influence specified in the subsequent input as a weight of the second characteristic;

after receiving the subsequent input, the generative artificial intelligence is configured to:
- create a subsequent creator embedding based at least in part on the subsequent input; and
- generate the subsequent output based at least in part on:
  - the subsequent creator embedding; and
  - an initial creator embedding created based at least in part on the initial input;

determining a creator attribution vector that includes one or more creator attributions based at least in part on:
- the initial output embedding;
- identifying one or more of the creators that contributed at least a threshold amount, wherein a particular creator having a contribution less than the threshold amount does not receive a creator attribution;
- the first amount of influence, specified by the user, of the first characteristic, and
- the second amount of influence, specified by the user, of the second characteristic; and initiating providing compensation to one or more content creators of a plurality of content creators based on the creator attribution vector.

9. The server of claim 8, further comprising:
determining, using automatic caption generation, a prompt guidance comprising a set of words that describes:
- one or more styles,
- one or more concepts,
- one or more types of content, or
- any combination thereof associated with individual creators of the plurality of content creators.

10. The server of claim 9, further comprising:
determining an initial prompt guidance associated with the initial input;
determining a subsequent prompt guidance associated with the subsequent input; and
determining a weighted sum of:
- the initial prompt guidance weighted based on the first amount of influence; and
- the subsequent prompt guidance weighted based on a subsequent amount of influence.

11. The server of claim 10, further comprising:
performing a first set of iterations of a latent diffusion model used by the generative artificial intelligence based at least in part on the initial prompt guidance, the first set of iterations determined based at least in part on the first amount of influence, the first set of iterations defining a content; and
performing a second set of iterations of the latent diffusion model based at least in part on the subsequent prompt guidance, the second set of iterations determined based at least in part on a subsequent amount of influence, the second set of iterations adjusting one or more of a style, a texture, or a characteristic.

12. The server of claim 8, further comprising:
based at least in part on determining that the subsequent input specifies a particular iteration of a diffusion process of a latent diffusion model used by the generative artificial intelligence in which to increase a similarity of the subsequent output to a particular one of the creators, increasing the similarity of the subsequent output to the particular one of the creators during the particular iteration of the diffusion process.

13. The server of claim 8, wherein the generative artificial intelligence generates the subsequent output based on the subsequent input by:
- transferring a particular style of a particular creator identified in the subsequent input; and
- updating the creator attribution vector based on the second amount of influence.

14. A non-transitory computer-readable memory device to store instructions executable by one or more processors to perform operations comprising:
determining that a generative artificial intelligence has generated an initial output based on an initial input provided by a user, the initial input comprising a prompt guidance identifying:
- a type of content to create;
- a first characteristic associated with the type of content; and
- a first amount of influence specified as a weight of the first characteristic;

determining an initial output embedding describing the initial output generated, by the generative artificial intelligence, in terms of creators, content items, characteristics, or any combination thereof;

determining that the generative artificial intelligence has generated a subsequent output based on a subsequent input, provided by the user, identifying:
- a second characteristic associated with the type of content, the second characteristic specified in the subsequent input; and
- a second amount of influence specified in the subsequent input as a weight of the second characteristic;

after receiving the subsequent input, the generative artificial intelligence is configured to:
- create a subsequent creator embedding based at least in part on the subsequent input; and
- generate the subsequent output based at least in part on:
  - the subsequent creator embedding; and
  - an initial creator embedding created based at least in part on the initial input;

determining a creator attribution vector that includes one or more creator attributions based at least in part on:
- the initial output embedding;
- identifying one or more of the creators that contributed at least a threshold amount, wherein a particular creator having a contribution less than the threshold amount does not receive a creator attribution;
- the first amount of influence, specified by the user, of the first characteristic, and
- the second amount of influence, specified by the user, of the second characteristic; and initiating providing compensation to one or more content creators of a plurality of content creators based on the creator attribution vector.

15. The non-transitory computer-readable memory device of claim 14, further comprising:
based at least in part on determining that the type of content comprises digital video content including a plurality of frames:

creating a plurality of frame embeddings using a Contrastive Language Image Pretraining (CLIP) embedding generator, individual frame embeddings of the plurality of frame embeddings corresponding to individual frames of the plurality of frames;

clustering, along a temporal axis associated with the digital video content, sequential frames based on the plurality of frame embeddings to create a plurality of clusters of frames; and determining the creator attribution vector based on the plurality of clusters of frames.

16. The non-transitory computer-readable memory device of claim 14, further comprising:

based at least in part on determining that the type of content comprises digital music content that includes a plurality of stems:

creating a plurality of stem embeddings using a Contrastive Language Audio Pretraining (CLAP) embedding generator, individual stem embeddings of the plurality of stem embeddings corresponding to individual stems of the plurality of stems; and determining the creator attribution vector based on the plurality of stems.

17. The non-transitory computer-readable memory device of claim 16, wherein:

the plurality of stems comprise either:

a vocal stem and at least one instrument stem; or a plurality of instrument stems.

18. The non-transitory computer-readable memory device of claim 14, further comprising:

based at least in part on determining that the type of content comprises a digital representation of a book that includes a plurality of sentences:

creating a plurality of sentence embeddings using a Contrastive Language Image Pretraining (CLIP) embedding generator, individual sentence embeddings of the plurality of sentence embeddings corresponding to individual sentences of the plurality of sentences;

clustering sequential sentences based on the plurality of sentence embeddings to create a plurality of clusters of sentences; and determining the creator attribution vector based on the plurality of clusters of sentences.

19. The non-transitory computer-readable memory device of claim 14, further comprising:

performing a first set of steps of a latent diffusion model used by the generative artificial intelligence based at least in part on the first amount of influence; and performing a second set of steps of the latent diffusion model based at least in part on the second set of steps determined based at least in part on a subsequent amount of influence.

20. The non-transitory computer-readable memory device of claim 14, the operations further comprising:

providing a statement accompanying the subsequent output identifying the one or more content creators based on the creator attribution vector.

* * * * *